(12) United States Patent
Joshi et al.

(10) Patent No.: US 7,478,149 B2
(45) Date of Patent: Jan. 13, 2009

(54) BUSINESS CONTINUATION POLICY FOR SERVER CONSOLIDATION ENVIRONMENT

(75) Inventors: Darshan B. Joshi, Fremont, CA (US);
Kaushal R. Dalal, Sunnyvale, CA (US);
James A. Senicka, Hampton, VA (US)

(73) Assignee: Symantec Operating Corporation, Cupertino, CA (US)

( * ) Notice: Subject to any disclaimer, the term of this patent is extended or adjusted under 35 U.S.C. 154(b) by 509 days.

(21) Appl. No.: 10/609,363

(22) Filed: Jun. 27, 2003

(65) Prior Publication Data

US 2004/0153708 A1 Aug. 5, 2004

Related U.S. Application Data

(63) Continuation of application No. 10/159,366, filed on May 31, 2002.

(51) Int. Cl.
*G06F 15/177* (2006.01)
*G06F 15/173* (2006.01)

(52) U.S. Cl. .................. 709/223; 709/220; 709/221; 709/224; 714/4; 714/13; 714/47

(58) Field of Classification Search .............. 709/220, 709/221, 223–224; 714/4, 13, 47
See application file for complete search history.

(56) References Cited

U.S. PATENT DOCUMENTS

| 5,442,791 | A | | 8/1995 | Wrabetz et al. ............ 395/650 |
|---|---|---|---|---|
| 5,958,070 | A | * | 9/1999 | Stiffler ....................... 714/13 |
| 6,088,727 | A | | 7/2000 | Hosokawa et al. ......... 709/223 |
| 6,212,562 | B1 | | 4/2001 | Huang ....................... 709/227 |
| 6,430,570 | B1 | * | 8/2002 | Judge et al. ............. 707/103 R |
| 6,662,219 | B1 | * | 12/2003 | Nishanov et al. ........... 709/220 |
| 6,799,208 | B1 | * | 9/2004 | Sankaranarayan et al. .. 709/223 |
| 6,823,382 | B2 | * | 11/2004 | Stone ......................... 709/224 |
| 6,874,145 | B1 | * | 3/2005 | Ye et al. ..................... 718/108 |
| 6,922,791 | B2 | * | 7/2005 | Mashayekhi et al. .......... 714/4 |
| 7,076,783 | B1 | * | 7/2006 | Frank et al. ................. 719/313 |
| 2001/0003831 | A1 | | 6/2001 | Boland ....................... 709/226 |
| 2004/0049579 | A1 | * | 3/2004 | Ims et al. ................... 709/225 |
| 2005/0177832 | A1 | * | 8/2005 | Chew ......................... 718/104 |

OTHER PUBLICATIONS

Epema, D.H.J., Livny, M., Dantzig, R. van, Evers, X., Pruyne, J., *A Worldwide Flock of Condors: Load Sharing Among Workstation Clusters*, Future Generations Computer Systems, vol. 12, No. 1, May, 1, 1996, pp. 53-65.

Mao, Zhuoqing Morley and Katz, Randy, *Achieving Service Portability in Iceberg*, Service Portability and Virtual Customer Environments, 2000 IEEE, pp. 20-28.

* cited by examiner

*Primary Examiner*—Nathan J. Flynn
*Assistant Examiner*—Joshua Joo
(74) *Attorney, Agent, or Firm*—Campbell Stephenson LLP

(57) ABSTRACT

A method, computer program product and system that establishes and maintains a business continuity policy in a server consolidation environment. Business continuity is ensured by enabling high availability of applications. When an application is started, restarted upon failure, or moved due to an overload situation, a system is selected best fulfilling the requirements for running the application. These requirements can include application requirements, such as an amount of available capacity to handle the load that will be placed on the system by the application. These requirements can further include system requirements, such as honoring a system limit of a number of applications that can be run on a particular system. Respective priorities of applications can be used to determine whether a lower-priority application can be moved to free resources for running a higher-priority application.

18 Claims, 17 Drawing Sheets

*Management Environment*

BUSINESS CONTINUATION POLICY FOR SERVER CONSOLIDATION ENVIRONMENT

This application is a continuation of application Ser. No. 10/159,366, filed on May 31, 2002, entitled "Business Continuation Policy For Server Consolidation Environment" and naming Darshan B. Joshi, Kaushal R. Dalal, and James A. Senicka as inventors, the parent application being incorporated herein by reference in its entirety.

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

As the use of open systems grows, the complexity of managing hundreds or thousands of servers becomes an increasingly difficult task. In addition, a demand for increased availability of the applications running on the servers presents a challenge. Many information technology (IT) managers are working to move from large numbers of small open systems, many running well below their capacities, to a much smaller number of large-scale enterprise servers running at or near their capacities. This trend in the IT industry is called "server consolidation."

One early answer to the demand for increased application availability was to provide one-to-one backups for each server running a critical application. When the critical application failed at the primary server, the application was "failed over" (restarted) on the backup server. However, this solution was very expensive and wasted resources, as the backup servers sat idle. Furthermore, the solution could not handle cascading failure of both the primary and backup servers.

Another possible solution is "N+1 clustering," where one enterprise-class server provides redundancy for multiple active servers. N+1 clustering reduces the cost of redundancy for a given set of applications and simplifies the choice of a server for failover, as an application running on a failed server is moved to the one backup server.

However, N+1 clustering is not a complete answer to the need for increased application availability, particularly in a true server consolidation environment. Enterprises require the ability to withstand multiple cascading failures, as well as the ability to take some servers offline for maintenance while maintaining adequate redundancy in the server cluster. Typical cluster management applications provide only limited flexibility in choosing the proper hosts for potentially tens or hundreds of application groups. Examples of commercially available cluster management applications include VERITAS® Global Cluster Manager™, VERITAS® Cluster Server, Hewlett-Packard® MC/Service Guard, and Microsoft® Cluster Server (MSCS).

N-to-N clustering refers to multiple application groups running on multiple servers, with each application group being capable of failing over to different servers in the cluster. For example, a four-node cluster of servers could support three critical database instances. Upon failure of any of the four nodes, each of the three instances can run on a respective server of the three remaining servers, without overloading one of the three remaining servers. N-to-N clustering expands the concept of N+1 clustering from a "backup system" to a requirement for "backup capacity" within the servers forming the cluster.

What is needed is a business continuity policy that enables critical enterprise applications to survive multiple failures by determining suitable systems for starting applications initially, redistributing applications when systems reach an overloaded condition, and restarting failed applications.

SUMMARY OF THE INVENTION

The present invention relates to a method, system and computer program product that establish and maintain a business continuity policy in a server consolidation environment. Business continuity is ensured by enabling high availability of applications. When an application is started, restarted upon failure, or moved due to an overload situation, a system is selected best fulfilling the requirements for running the application. These requirements can include application requirements, such as an amount of available capacity to handle the load that will be placed on the system by the application. These requirements can further include system requirements, such as honoring a system limit of a number of applications that can be run on a particular system. Respective priorities of applications can be used to determine whether a lower-priority application can be moved to free resources for running a higher-priority application.

In one feature, a method includes detecting that a first application running on a first system within a cluster has failed. The method includes determining whether the first application can be failed over to a second system. When the first application can be failed over, the first application is restarted on the second system. When the first application cannot be failed over, the method includes determining whether a third system satisfies a first prerequisite for the first application. When the third system satisfies the first prerequisite, the first application is moved to the third system.

In one embodiment, the third system satisfies the first prerequisite when the third system has an available resource fulfilling the first prerequisite. The method may also include using a first priority of the first application and a second priority of the second application for determining whether the second application can be moved.

In one embodiment, the method can further include determining whether a second application of the applications running on the third system of the systems can be moved to free a resource for running the first application when the third system does not satisfy the first prerequisite. When the second application can be moved, the method can further include determining whether a fourth system of the systems satisfies a second prerequisite for the second application of the applications. When the fourth system satisfies the second prerequisite, the method can further include moving the second application to the fourth system and moving the first application to the third system.

In another embodiment, the method can further include determining whether a second application of the applications can be moved. When the second application can be moved, the method can further include determining whether a fourth system of the systems satisfies a second prerequisite for the second application of the applications. When the fourth system satisfies the second prerequisite, the method can further include moving the second application to the fourth system.

In yet another embodiment, the detecting whether the first application has failed can further include simulating that the first application has failed or simulating that the first system has failed.

In another feature of the invention, a method for providing business continuity includes detecting that a first application of a plurality of applications is to be started and determining whether a first system of a plurality of systems in a cluster meets a first prerequisite for the first application. When the first system meets the first prerequisite, the method further includes starting the first application on the first system. When the first system does not meet the first prerequisite, the method further includes determining whether a second system of the systems satisfies the first prerequisite. When the second system satisfies the first prerequisite, the method further includes starting the first application on the second system.

In this method, detecting that the first application is to be started can include detecting that the first application has failed while running on a third system of the systems. Detecting that the first application is to be started may also include detecting that the first application is running on a third system that is overloaded.

In another feature of the invention, a system includes means for detecting that a first application of a plurality of applications running on a first system of a plurality of systems within a cluster has failed. The system further includes first determining means for determining whether the first application can be failed over to a second system, means for restarting the first application on the second system, second determining means for determining whether a third system of the systems satisfies a first prerequisite for the first application, and means for moving the first application to the third system.

The system may further include third determining means for determining whether a second application of the applications can be moved, fourth determining means for determining whether a fourth system of the systems satisfies a second prerequisite for the second application of the applications, and second moving means for moving the second application to the fourth system. The system may further include means for using a first priority of the first application among the applications and a second priority of the second application among the applications for determining whether the second application can be moved.

In another feature of the invention, a computer program product includes detecting instructions to detect that a first application of a plurality of applications running on a first system of a plurality of systems within a cluster has failed. The computer program product further includes first determining instructions to determine whether the first application can be failed over to a second system of the systems, restarting instructions to restart the first application on the second system, second determining instructions to determine whether a third system of the systems satisfies a first prerequisite for the first application, moving instructions to move the first application to the third system, and a computer-readable medium for storing the detecting instructions, the first determining instructions, the restarting instructions, the second determining instructions, and the moving instructions.

The computer program product can further include third determining instructions to determine whether a second application can be moved, fourth determining instructions to determine whether a fourth system satisfies a second prerequisite for the second application, and second moving instructions to move the second application to the fourth system. The computer-readable medium further stores the third determining instructions, the fourth determining instructions, and the second moving instructions.

The computer program product can further include using instructions to use a first priority of the first application among the applications and a second priority of the second application among the applications to determine whether the second application can be moved. The computer-readable medium further stores the using instructions.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

FIG. 6 shows the calculation of available capacity for a cluster of servers in a server consolidation environment.

FIG. 7 shows the movement of an application upon failure of one of the servers of FIG. 6 and the resulting available capacity in the cluster.

FIG. 8 shows the movement of another application in the failure scenario of FIG. 7.

FIG. 9 shows an example configuration of database applications in the cluster of FIG. 6.

FIG. 10 shows movement of database applications in a failure scenario in the configuration of FIG. 9.

FIG. 11 shows an example of managing application groups using limits and prerequisites.

FIG. 12 shows a failure scenario in which an application group cannot be failed over.

FIG. 13 shows stopping a lower-priority application group to free sufficient resources to enable a higher-priority application to remain available.

FIG. 14 shows another failure scenario for the configuration of FIGS. 12 and 13.

FIG. 15 shows movement of a lower-priority application group to free sufficient resources to enable a higher-priority application group to remain available.

FIG. 16 shows movement of the higher-priority application group to use the resources freed as a result of the action shown in FIG. 15.

Figure 1:
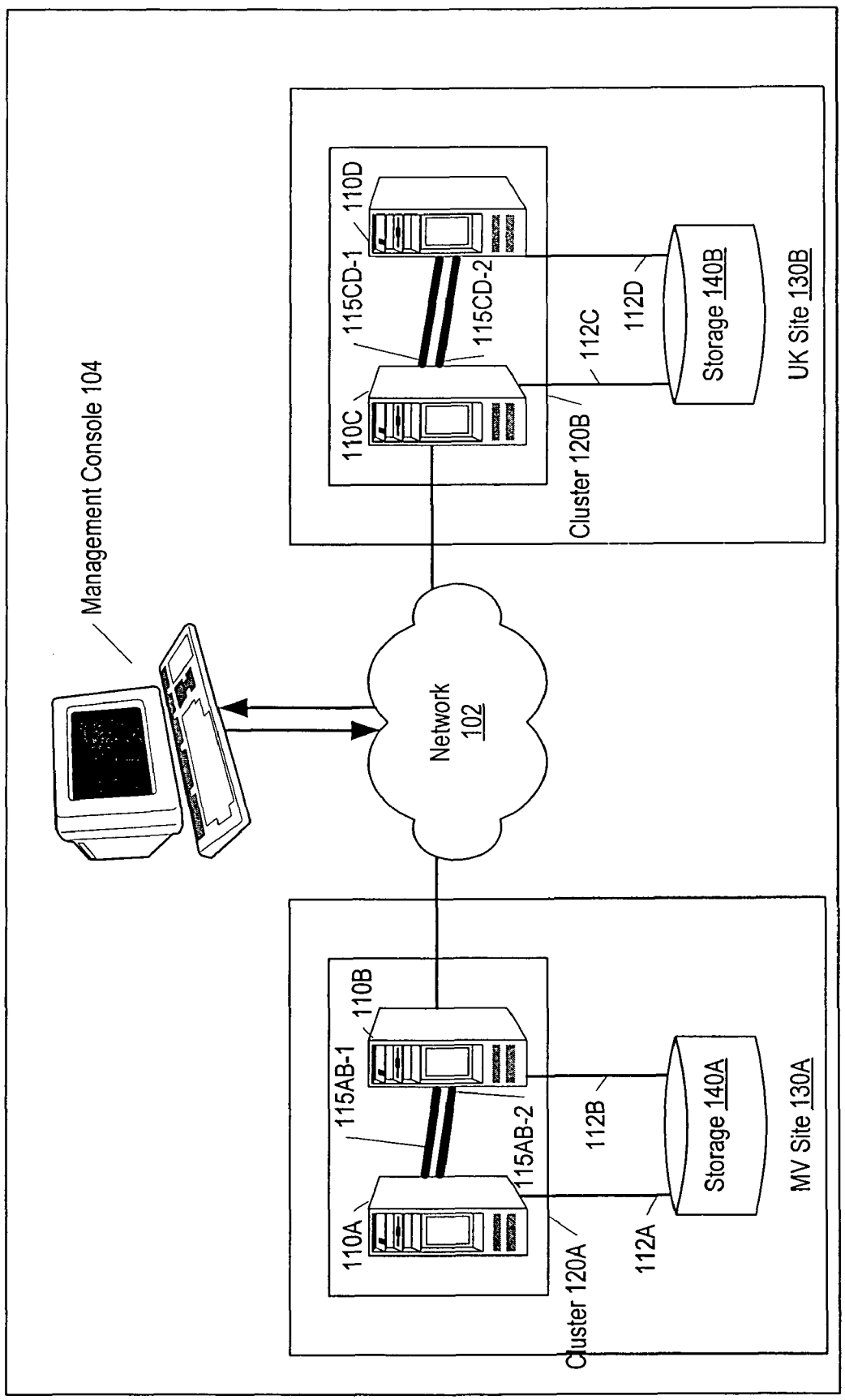
FIG. 1 provides an example of an environment in which the management system and framework of the present invention operates.

The use of the same reference symbols in different drawings indicates similar or identical items. While the invention is susceptible to various modifications and alternative forms, specific embodiments thereof are shown by way of example in the Drawings and are described herein in detail. It should be understood however, that the Drawings and Detailed Description are not intended to limit the invention to the particular form disclosed. On the contrary, the intention is to cover all modifications, equivalents, and alternatives falling within the scope of the present invention as defined by the appended Claims.

DETAILED DESCRIPTION

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Introduction

The present invention provides a business continuity policy that proactively determines the best possible system, typically a server in a cluster of servers, to host an application during startup, upon an overload condition, or following an application or server fault. The terms server and system are used interchangeably herein, as one of skill in the art will recognize that the present invention also applies to systems operating outside a client/server environment.

FIG. 1 provides an example of an environment in which the management system and framework of the present invention operates. Nodes 110A and 110B at Mountain View (MV) site 130A and nodes 110C and 110D at United Kingdom (UK) site 130B are shown for purposes of illustration. The invention is not limited to minimum or maximum numbers of nodes and/or sites. While typically the term "site" describes a collection of nodes concentrated at a data center or on a campus such that cables can interconnect the nodes and storage devices, geographic concentration is not a requirement for a site. A site can include one or more clusters of nodes and can be viewed as a virtual collection of one or more clusters.

MV site 130A and UK site 130B are shown as connected via network 102, which typically corresponds to a private wide area network or a public distribution network such as the Internet. Common management console 104 is shown to be used for managing nodes and clusters of nodes, although a common management console is not necessary for operation of the invention.

Cluster 120A includes nodes 110A and 110B at MV site 130A, which are connected via redundant cluster connections 115AB-1 and 115AB-2. Although only one cluster is shown at MV site 130A, any number of clusters may be included at a site. Node 110A shares common storage 140A with node 110B. Node 110A is interconnected with storage 140A via interconnection 112A, and node 110B is interconnected with storage 140A via interconnection 112B.

Similarly, cluster 120B includes nodes 110C and 110D at UK site 130B, which are connected via redundant cluster connections 115CD-1 and 115CD-2. Node 110C shares common storage 140B with node 110D. Node 110C is interconnected with storage 140B via interconnection 112C and node 110D is interconnected with storage 140B via interconnection 112D.

Figure 2:
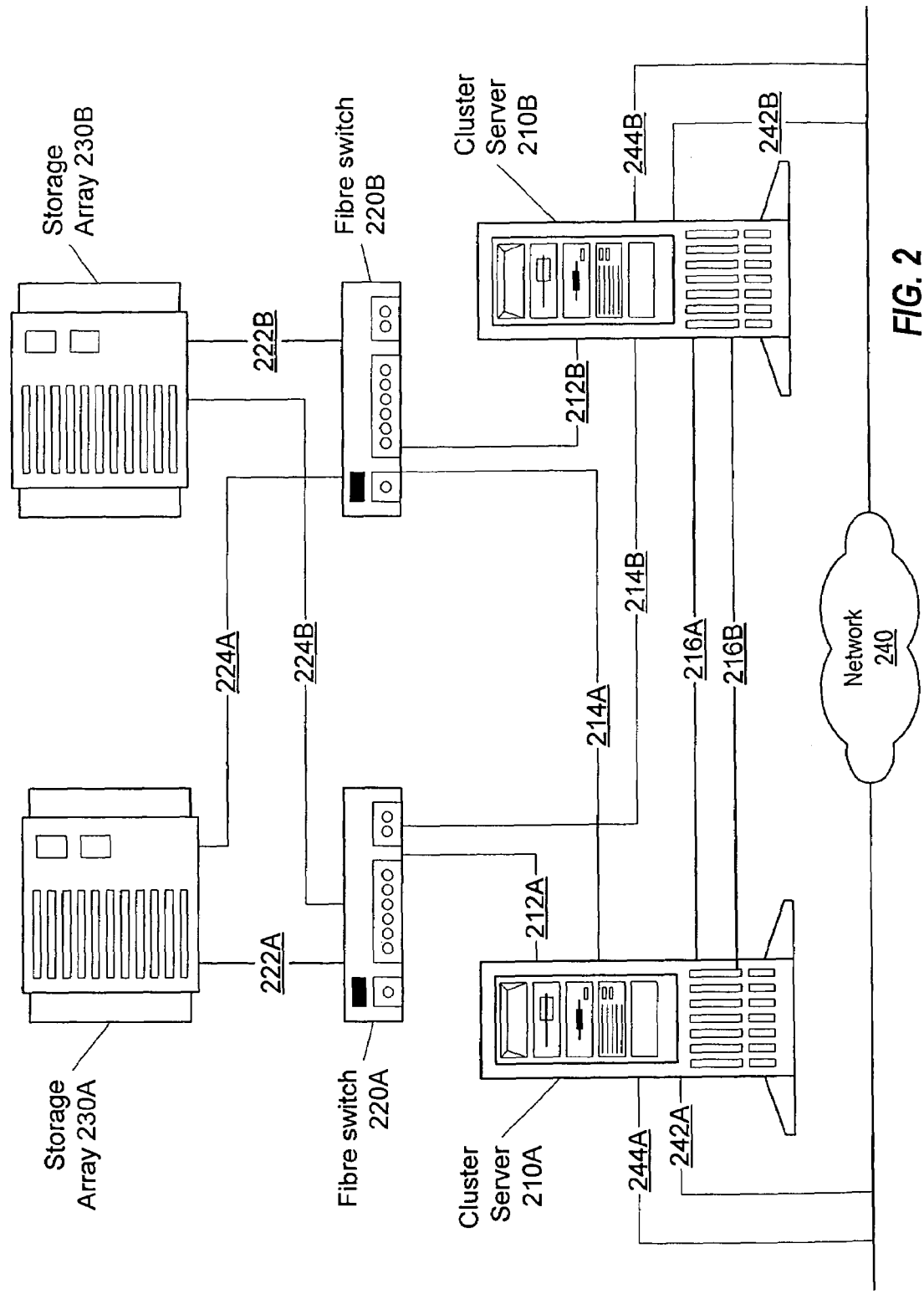
FIG. 2 shows an example of a cluster configuration in a high-availability storage area network.

FIG. 2 shows an example of a cluster configured for high availability in a storage area network. Cluster servers 210A and 210B are configured as servers for the same application program and serve as fail over targets for each other. Redundant interconnections 216A and 216B can be redundant heartbeat private network connections via crossover cables between redundant network interface cards (NICs) when two nodes form the cluster. When more than two nodes form the cluster, the private network connection can use a hub. The private network enables fail over software to recognize when a system or process has failed. Each of clusters 210A and 210B has redundant public network connections, such as public network connections 242A and 244A for cluster server 210A and public network connections 242B and 244B for cluster server 210B, to communicate via a public network 240 such as the Internet.

Cluster server 210A has redundant connections to a fibre channel storage area network via fibre channel connection 212A to fibre switch 220A and via fibre channel connection 214A to fibre switch 220B. Similarly, cluster server 210B is connected to the fibre channel storage area network via fibre channel connection 212B to fibre switch 220B and via fibre channel connection 214B to fibre switch 220A.

The fibre channel storage area network provides access by cluster servers 210A and 210B to each of shared storage arrays 230A and 230B. Storage arrays 230A and 230B may correspond, for example, to fibre channel RAID arrays. Fibre switch 220A is connected to storage array 230A via fibre channel connection 222A and to storage array 230B via fibre channel connection 224A. Similarly, fibre switch 220B is connected to storage array 230B via fibre channel connection 222B and to storage array 230A via fibre channel connection 224B. Redundant connections from the cluster server to the switch and from the switch to the storage array ensure that each of cluster servers 210A and 210B has a connection to a collection of storage devices on the fibre channel network. Redundant power sources (not shown) also can be included to provide a backup power source in the event of a power failure.

Cluster Management To ensure disaster recovery, data loss must be prevented and consistent data maintained even if hardware or software failures occur. Data for a particular application should not be allowed to enter a state in which the failure of the network or a node would leave that application and corresponding application data in an inconsistent or unusable state.

Cluster management applications enable administrators to manage multiple, discrete clusters from a single application. By coordinating events and actions across clusters, cluster management applications provide a useful tool for managing disaster recovery. For example, a second cluster may take over an application running on a primary cluster when no node within the primary cluster can run the application. Examples of commercially available cluster management applications include VERITAS® Global Cluster Manager™, Hewlett-Packard® MC/Service Guard, and Microsoft® Cluster Server (MSCS).

In some cluster management applications, a process called the site master at each site may connect to one or more site slave processes within the site. The site master collects all information about all of the clusters and nodes in that site. In addition, each site master may connect to all other site masters in the distributed system to share information so all site masters have information about the entire distributed system. While it is not a requirement that each site have its own master for operation of the invention, a master must have detailed information, sometimes at the software process level, about the state of hardware and software resources at the site. The term master refers to a site master and is also referred to herein as a master process.

Typically, a cluster management application constantly monitors the state of software applications in multiple clusters and can determine if an entire site becomes unavailable, such that no node in the clusters at the site is available to run the software application. The cluster management application may start the software application at a secondary site unaffected by the circumstances that made the primary site unavailable. A cluster management application may be controlled by a user via a user interface, or the cluster management application may be configured to act automatically.

In the event that the primary data center is destroyed, the application data must be immediately available at another site, and the application must be immediately started at the other site. This level of availability requires replication of the data from the primary site to the other site. Various data replication applications are available for replicating data across sites, including VERITAS® Volume Replicator™ (VVR), Symmetrix Remote Data Facility (SRDF®) by EMC® Corporation, Hitachi® Asynchronous Remote Copy (HARC), Sybase® Replication, and Continuous Access by Hewlett-Packard®.

Factors included in the determination of the "best" server to initially start or to re-start an application include server capacity and finite resource availability. In one embodiment described herein, the business continuity policy is implemented as a component of a cluster management application.

FailOver Policy

One component of a business continuity policy is a FailOver Policy. Several different FailOver Policies are possible, including Priority, Round Robin, and a Load FailOver policy included with the present invention.

A Priority FailOver Policy is the most basic strategy. The server system with the lowest priority in a running state is chosen as the failover target. A "failover target" is a system selected to host the application groups that must be re-started. For example, priority can be set implicitly via ordering in a SystemList, such as SystemList={server1, server2} or explicitly by setting priority in the SystemList, such as SystemList={system1=0, system2=1}. The Priority FailOver Policy strategy works well for a simple two-node cluster, or for a small cluster with a small number of application groups.

A Round Robin FailOver Policy chooses the server system running the, smallest number of application groups as a failover target. Round Robin FailOver Policy is often used for larger clusters running a large number of application groups having essentially the same server load characteristics (for example, servers running similar databases or applications).

The Load FailOver Policy described herein enables a framework for server consolidation at the data center. In a preferred embodiment, Load FailOver Policy takes into account System Capacity, Application Group Load, System Limits and Application Group Prerequisites.

Load FailOver Policy: Capacity and Load

In one embodiment, a system Capacity variable, also referred to herein as Capacity, for a system is set to a fixed value representing the system's load handling capacity. An application group Load variable, also referred to herein as Load, for an application is set to a fixed demand (Load) placed on a processor by the application group. For example, consider a 4-node cluster consisting of two 16-processor servers and two 8-processor servers. The administrator sets a Capacity value on the 16-CPU servers to 200 and the 8-CPU servers to 100. These Capacity values can be arbitrarily assigned but should reflect differences in capacity of the respective systems.

Similarly, each application group running on a system has a predefined Load value. When an application group is brought online, the application group's Load is subtracted from the available capacity of the system.

In one embodiment, a cluster management application keeps track of the available capacity of all systems in the cluster using an AvailableCapacity variable for each system. AvailableCapacity is determined by subtracting Load of all applications groups online (an application group is considered online if the application group is fully or partially online) on a system from the system's Capacity. When a failover occurs, the cluster management application determines the system with the highest AvailableCapacity and starts the application group on that system. During a failover scenario involving multiple application groups, failover decisions can be made serially to facilitate the proper load-based choice; however, online operations to bring applications online on alternate systems can be performed in parallel.

Capacity is a soft restriction, indicating that the value of AvailableCapacity can fall below zero. During a cascading failure scenario, AvailableCapacity can be negative.

Load FailOver Policy: Static Load vs. Dynamic Load

The dynamic load of a server can be calculated using a formula AvailableCapacity=Capacity–(Sum of Load of all online application groups). An alternative strategy for determining dynamic load is provided by some cluster management applications, including early versions of VERITAS Cluster Server (VCS) prior to VCS 2.0. These cluster management applications allow an administrator to determine a dynamic load of a server with an outside monitoring program and set a DynamicLoad variable to reflect the value determined. The administrator can run any monitoring package desired, and then provide an estimated load to the cluster management application. If DynamicLoad is so provided, this value can be used to override calculated Load values; for example, AvailableCapacity can be calculated using the formula AvailableCapacity=Capacity–DynamicLoad. This calculation allows an administrator to control system load more accurately than using estimated application group loading.

However, the administrator must set up and maintain a load estimation package in addition to the cluster management application. In some cluster management applications using a Load FailOver Policy, the system with the lowest value in the DynamicLoad variable is chosen for a failover target.

In summary, available capacity of all systems to host application groups can be calculated using the following formula:

AvailableCapacity of a system=Capacity–Current System Load where

Current System Load=Dynamic system load if dynamic system load variable is specified

OR

Sum of Load of all application groups online on the system.

Load FailOver Policy: Limits and Prerequisites

System Limits and application group Prerequisites can also be used in a business continuity policy. An administrator can provide the finite resources available on each system (Limits), such as shared memory segments, semaphores and other system resources. For example, a particular server may be capable of hosting no more than two database applications. Furthermore, a set of Prerequisites, each of which corresponds to available system resources and/or capacity, can be established for each application group. For example, a particular database application may need, and have a Prerequisite indicating, five shared memory segments and twenty semaphores.

In one embodiment, all of the Prerequisites specified in an application group's set of Prerequisites must be met before the application group can be started. In one embodiment, system Limits cannot be overridden, such that a system cannot be not chosen as a failover target if the system has already reached its allowed Limits.

Under the business continuity policy of the present invention, a set of eligible systems that meet the failed application group's Prerequisites, which can be equivalent to the application group's Load, is identified. This set can be limited to only those systems that also have sufficient AvailableCapacity to accept the failed application group and remain within the system's Limits. From this set of eligible systems, the least loaded system can be selected as a failover target. A system that does not meet all the Prerequisites of an application group cannot be selected as a failover target. When a decision is made to bring an application group online on a particular system, the values of the set of Prerequisite variables for the system resources required for the application group are subtracted from the Current Limits of the system to indicate that these system resources are already allocated.

In one embodiment of the invention, administrators first define application group Prerequisites and then define corresponding Limits for each system. In this embodiment, each system can have different Limits, and only the Prerequisites and Limits applicable to each application group and system are required to be defined. If a system has no defined Limits for a given system resource, then a default value of 0 can be assumed. Similarly, when Prerequisites are not defined for a given system resource, a default value of 0 can be assumed.

As an example of definitions of the Prerequisites and Limits variables, the following configuration can be established to allow only one group online on a system at a given point in time:

Prerequisites={GroupWeight=1}

Limits={GroupWeight=1}

By specifying a Prerequisite GroupWeight value of one, only one application group can be online at a given time. In addition, by specifying a Limits GroupWeight value of one for each system, each system can have only one application group online at a time. The GroupWeight value can be considered to represent the number of application groups that can be brought online. When the GroupWeight value is zero, no more application groups can come online on that particular system. For example, consider a system having two systems, S1 and S2, each specifying a Limit of GroupWeight=1. The system also has three application groups, G1, G2 and G3. Groups G1 and G2 have Prerequisites of GroupWeight=1, and group G3 has no Prerequisites. A Prerequisite of Group-Weight=1 for G1 and G2 indicates that each of G1 and G2 requires one "unit" of GroupWeight to be brought online. When G1 goes online at S1, S1's CurrentLimits become GroupWeight=0, thus preventing G2 from also going online on S1. G3, having no Prerequisites, can go online on either S1 or S2.

Prerequisites and Limits can be used to determine a set of eligible systems on which an application group can be started during failover or upon startup. Once a set of eligible systems meeting the Prerequisites and Limits is identified, the established FailOver Policy dictates which of the set of eligible systems is selected as the failover target.

EXAMPLE SYSTEM AND APPLICATION GROUP ATTRIBUTES

Table 1 below provides an example of one embodiment including system attributes that can be used to implement the business continuity policy of the present invention. Table 2 provides examples of application group attributes.

TABLE 1

System attributes

| Attribute | Data Type | Description |
|---|---|---|
| Capacity | Int | Integer value expressing total system load capacity. This value is relative to other systems in the cluster and does not reflect any real value associated with a particular system. For example, the administrator may assign a value of 200 to a 16-processor machine and 100 to an 8-processor machine. Default = 1 |
| LoadWarningLevel | Int | A value, expressed as a percentage of total capacity, where load has reached a critical limit. For example, setting LoadWarningLevel = 80 sets the warning level to 80%. Default = 80% |
| LoadTimeThreshold | Int | How long the system load must remain at or above LoadWarningLevel before the Overload warning is provided. Default = 900 seconds. |
| LoadTimeCounter | Int (system) | System-maintained internal counter of the number of seconds the system load has been above LoadWarningLevel. Incremented every 5 seconds. This value resets to zero when system Load drops below the value in LoadWarningLevel. |

TABLE 1-continued

System attributes

| Attribute | Data Type | Description |
| --- | --- | --- |
| Limits | Association | An unordered set of name = value pairs denoting specific resources available on a system. The format for Limits is as follows: Limits = { Name = Value, Name2 = Value2 }. For example, to configure a system with 10 shared memory segments and 50 semaphores available, the proper entry is:<br>Limits = { ShrMemSeg = 10,<br>Semaphores = 50 }<br>Note, the actual names used in setting limits is arbitrary and is not actually obtained from the system. This allows the administrator to set up virtually any value desired. |
| CurrentLimits | Association (system) | System-maintained value of current values of limits. CurrentLimits = Limits − (additive value of all service group Prerequisites). For example, if ShrMemSeg = 10, and one group is online with a ShrMemSeg Prerequisite of 5, CurrentLimits equals { ShrMemSeg = 5 }. |
| DynamicLoad | Int (system) | System-maintained value of current dynamic load. This value can be set by an external monitoring system. |
| AvailableCapacity | Int (system) | AvailableCapacity = Capacity − Current System Load<br>Current System Load = DynamicLoad if dynamic system load is specified OR Current System Load = Sum of Load of all groups online on that system.<br>For the purpose of the above calculation, a group is considered online if it is fully or partially online, starting or stopping. |

TABLE 2

Application Group Attributes

| Attribute | Data Type | Description |
| --- | --- | --- |
| Load | Int | Integer value expressing total system load this application group places on a system. |
| Prerequisites | Association | An unordered set of name = value pairs denoting specific resources required by this application group. The format for Prerequisites is as follows: Prerequisistes = { Name = Value, name2 = value2 }. For example, to configure an application group to require 10 shared memory segments and 15 semaphores before it can start, the proper entry is:<br>Prerequisites = { ShrMemSeg = 10,<br>Semaphores = 15 }<br>Note, the actual names used in setting Prerequisites are arbitrary and are not actually obtained from the system. Use care to ensure that names listed in Prerequisites match the names in Limits. |
| AutoStartPolicy | String Scalar | Sets the method for choosing a system to start an application group when the cluster comes up. This is only applicable if multiple systems are listed the in AutoStartList. In this example implementation, possible values are Order, Priority and Load.<br>Order (default): Systems are chosen in the order in which they are defined in the AutoStartList attribute.<br>Load: Systems are chosen in the order of their capacity as designated in the AvailableCapacity system attribute. The system with the highest capacity is chosen first.<br>Priority: Systems are chosen in the order of their priority in the SystemList attribute. Systems with the highest priority (having the lowest value for the Priority variable) are chosen first. |
| FailOverPolicy | String Scalar | Selects one of three possible failover policies. Possible values are Priority, Round Robin and Load. |
| SystemZones | Association | Indicates the virtual sub-lists within the SystemList attribute that are preferred failover targets. Values are string/integer pairs. The string is the name for a system in the |

TABLE 2-continued

Application Group Attributes

| Attribute | Data Type | Description |
|---|---|---|
| | | SystemList attribute, and the integer is the number of the zone. Systems with the same zone number are members of the same zone. If an application group faults on one system in a zone, systems within the zone are preferred failover targets, despite the policy specified by the FailOverPolicy attribute. |

Establishing Application Group and System Configurations

The following configuration file, main.cf, illustrates a system definition and an application group definition.

```
include "types.cf"
cluster SGWM-demo (
    )
system LargeSvr1 (
    Capacity = 200
    Limits = { ShrMemSeg=20, Semaphores=100, Processors=12}
    LoadWarningLevel = 90
    LoadTimeThreshold = 600
    )
group G1 (
    SystemList = { LgSvr1, LgSvr2, MedSvr1, MedSvr2 }
    SystemZones = { LgSvr1=0, LgSvr2=0, MedSvr1=1, MedSvr2=1 }
    AutoStartPolicy = Load
    AutoStartList = { MedSvr1, MedSvr2 }
    FailOverPolicy = Load
    Load = 100
    Prerequisites = { ShrMemSeg=10, Semaphores=50, Processors=6 }
}
    )
```

Using Capacity and Prerequisites

Using Capacity and Prerequisites together enables determination of a suitable failover system. In one embodiment, the system meeting the Prerequisites for a given application group and having the highest AvailableCapacity is selected. If multiple systems satisfy the Prerequisites for the given application group and have the same AvailableCapacity, the first system in the SystemList can be chosen. Note that a system meeting the Prerequisites for an application group may not be eligible to host the application group if the system's Limits are already met. The system's Limits are already met when the Current Limits for the system allow sufficient resources to meet the Prerequisites for the given application group.

As mentioned earlier, in one embodiment, Capacity is a soft limit. The system with the highest AvailableCapacity value can be selected, even if a negative AvailableCapacity value is produced when the application group is started on the system.

Overload Warning

In one embodiment, an overload warning is provided as part of the Load FailOver Policy. When a server sustains a pre-determined load level set by a LoadWarningLevel variable (statically or dynamically determined) for a predetermined time, set by a LoadTimeThreshold variable, an overload warning is initiated. The overload warning can be provided by a user-defined script or application designed to implement the FailOver Load Policy of a given enterprise. For example, the user-defined script may provide a message on a console for the operator, or the user-defined script may move or shut down application groups based on user-defined priority values. For example, if Load on a server running a business critical database reaches and stays above a user-defined threshold, operators can be immediately notified. The user-defined script could then scan the system for any application groups with a lower priority than the database, such as an internal Human Resources application, and shut down or move the lower-priority application to a system with a smaller current Load.

System Zones

In one embodiment, SystemZones are used to designate a preferred subset of systems from which to select in an initial failover decision. A cluster management application implementing a business continuity policy tries to re-start an application group within the application group's zone before choosing a system in another zone. For example, consider a typical 3-tier application infrastructure with web servers, application servers and database servers. The application and database servers can be configured in a single cluster. Using SystemZones enable the cluster management application for an application group to try to fail to another application zone server if another application zone server is available. If another application zone server is not available, the cluster management application can try to failover to the database zone based on Load and Limits. In this configuration, excess Capacity and Limits available in the database zone are reserved for the larger load of a database failover, while application servers handle the Load of application groups in the application zone. During a cascading failure, excess capacity in the cluster remains available to application groups. The SystemZones feature allows fine tuning application failover decisions, yet retains the flexibility to failover anywhere in the cluster if necessary.

Load-Based AutoStart

In one embodiment, the concepts of the Load FailOver Policy can also be used to determine where an application group should come up when the cluster initially starts. Administrators can set an AutoStartPolicy variable to Load and allow the cluster management application to determine the best system on which to start the application group. Application groups can be placed in an AutoStart queue for load-based startup when the cluster management application determines the available systems. As with failover, a subset of systems is first created that meet the Prerequisites and Limits, then of those systems, the system with the highest AvailableCapacity can be chosen.

Using AutoStartPolicy=Load and SystemZones together allows the administrator to establish a list of preferred systems in a cluster to initially run an application group. As mentioned above, in a 3-tier architecture, the administrator can designate that application groups start first in the application zone and database groups start in the database zone.

Using Application Priorities in Conjunction with the Load FailOver Policy

By combining the Load FailOver Policy described above with application priorities, a truly automated business continuity policy for mission/business critical applications is provided. This business continuity policy adds the necessary business intelligence to the cluster framework to make policy driven decisions at time of failure to best maintain critical applications and application performance.

Application group Priorities allow the administrator to specify the relative importance of an application group over other application groups. During any failure event, the cluster management application can determine a suitable failover system based on application group Priorities, Load and Limits. For most single application group or single server failures, most clusters will have adequate spare capacity. However, in a situation involving multiple failures, or reduced cluster capacity following a Disaster Recovery event, more difficult decisions may be required.

Application group Priorities effectively provide a mechanism for the cluster to provide triage. The most critical application groups remain functional, at adequate performance levels, at the possible expense of lower priority applications.

In one embodiment, the following priorities can be assigned to an application group:

Priority 1—Mission Critical

Priority 1 application groups must remain online and be restarted immediately upon failure. The cluster management application can be configured to avoid stopping or moving Priority 1 application groups, unless the application group specifically faults or the operator intervenes. Priority 1 application groups can sustain only the downtime necessary to restart the application group.

Priority 2—Business Critical

Priority 2 application groups are only slightly less important than Priority 1 application groups. The cluster management application must keep these application groups online, but may perform a switchover, to moving the Priority 2 application group to another server, maintain cluster Load characteristics.

Priority 3—Task Critical

Priority 3 application groups may be moved at will to maintain cluster loading. Priority 3 application groups also may be stopped to maintain adequate Load handling capability in the cluster, but only if a move is not possible.

Priority 4—Task Non-Critical

Priority 4 Application groups are non-essential applications such as test applications or various internal support programs. These application groups may be stopped at will to maintain cluster loading. During any cluster reconfiguration, the cluster management application can remove all Priority 4 application groups from the calculation and make its best recommendation for reconfiguration. Priority 4 applications may only be brought online in the cluster if the cluster management application determines that there is adequate load capacity remaining in the cluster.

Figure 3:
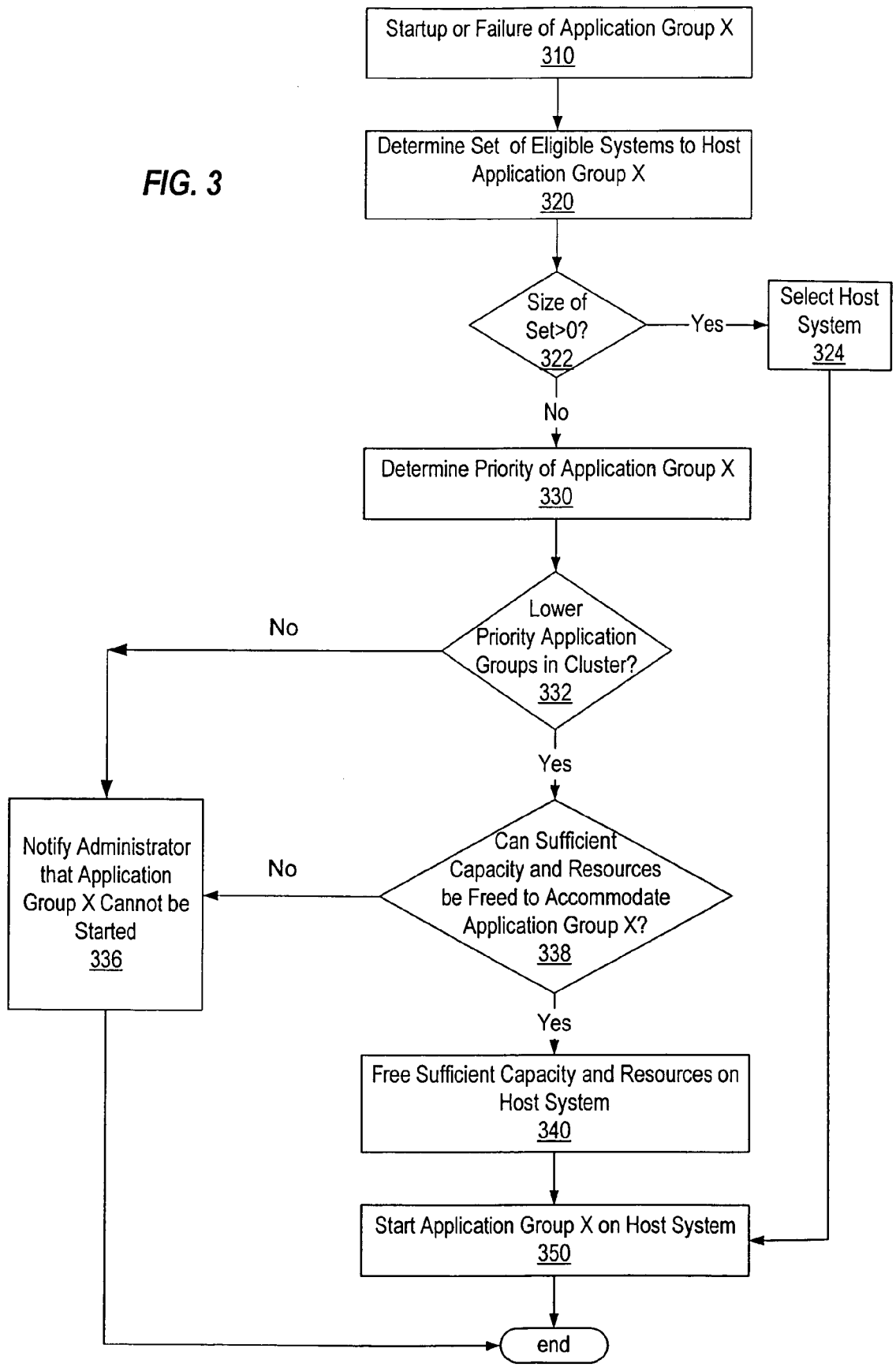
FIG. 3 is a flowchart of a method for implementing a business continuity policy in a server consolidation environment.

FIG. 3 is a flowchart of a method for implementing a business continuity policy in a server consolidation environment. The method begins upon startup or failure of a given application group, here called application group X, in Startup or Failure of Application Group X step 310. A set of systems eligible to host application group X is identified in Determine Set of Eligible Systems to Host Application Group X step 320. At Size of Set>0 decision point 322, a determination is made whether any eligible systems were identified. If so, control proceeds to Select Host System 324 to select a host system (either an initial system upon startup or a failover target) for running application group X. For example, the host system can be selected as the eligible system having the highest Available Capacity. Other policies can also be used to select a host system according to the needs of the business implementing a business continuity policy. Control then proceeds to Start Application Group X on Host System step 350 to start application group X on the selected host system.

If at Size of Set>0 decision point 322, the set includes no eligible systems for hosting application group X, control proceeds to Determine Priority of Application Group X step 330. A respective priority for application group X among all application groups running on the cluster is determined. The priority of a given application group is configurable and can be assigned by an administrator of the server consolidation environment. For example, to determine the respective priority for application group X, the priority can be retrieved from data stored for a cluster management application managing the cluster in the server consolidation environment.

From Determine Priority of Application Group X step 330, control proceeds to Lower Priority Application Groups in Cluster decision point 332. If no lower priority applications are running, control proceeds to Notify Administrator that Application Group X Cannot be Started step 336. Because no eligible systems exist for application group X, application group X cannot be started without preempting another application of the same or higher priority. An administrator can determine whether Application Group X should be preempted. In one embodiment, the process for handling the situation where an application group cannot be restarted is configurable within a cluster management application and can be provided as a user-defined script.

If at Lower Priority Application Groups in Cluster decision point 332, lower priority application groups are running, control proceeds to Can Sufficient Capacity and Resources be Freed to Accommodate Application Group X decision point 338. In Can Sufficient Capacity and Resources be Freed to Accommodate Application Group X decision point 338, an evaluation of the available resources in the systems of the cluster is made. This evaluation is discussed in further detail with reference to FIG. 5.

If sufficient capacity and resources cannot be freed, control proceeds to Notify Administrator that Application Group X Cannot be Started step 336. If sufficient capacity and resources can be freed, control proceeds to Free Sufficient Capacity and Resources on Host System step 340.

In Free Sufficient Capacity and Resources on Host System step 340, capacity and resources are freed on one or more systems to enable sufficient resources for application group X to run on a given host system. From Free Sufficient Capacity and Resources on Host System step 340, control proceeds to Start Application Group X on Host System step 350.

Figure 4:
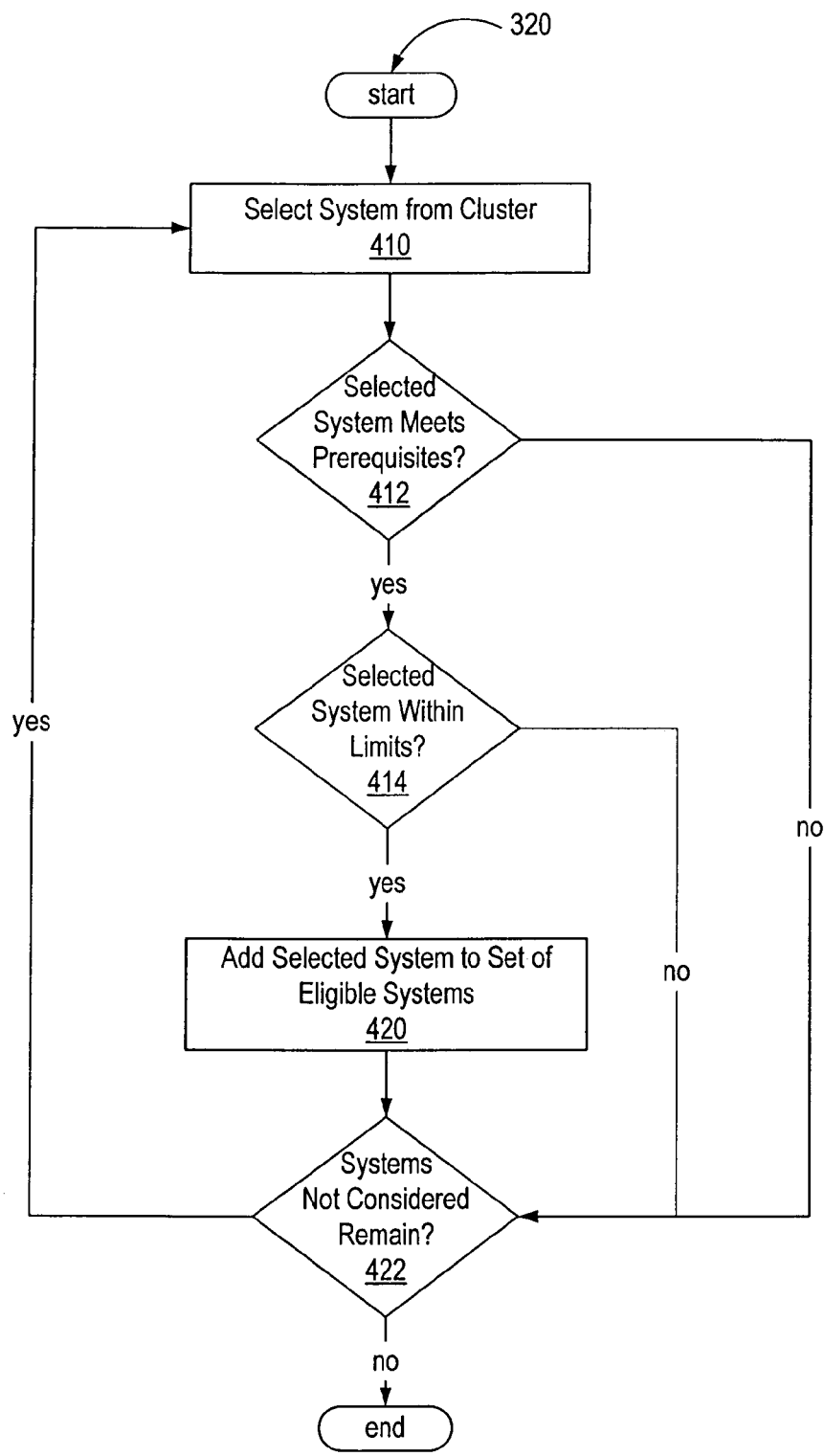
FIG. 4 is a flowchart of the Determine Set of Eligible Systems to Host Application Group X step of the flowchart of FIG. 3.

FIG. 4 is a flowchart of the Determine Set of Eligible Systems to Host Application Group X step 320 of FIG. 3. In Select System from Cluster step 410, a system within the cluster of systems not previously evaluated is selected to determine whether the system is eligible. Control then proceeds to Selected System Meets Application Requirements decision point 412. If the selected system does not meet the requirements for application group X, such as a prerequisite for application group X, control proceeds to Systems Not Considered Remain decision point 422 to determine whether another system is available for evaluation.

If the selected system meets the requirements for application group X, control proceeds to Selected System Meets System Requirements decision point 414. For example, a determination whether the selected system is within its Limits can be made by adding the system's Current Limits to the Prerequisites for Application Group X. The sum must be less than the Limits of the Selected System to meet the Limits criterion. As another example, a system requirement may be that a particular CPU remains below a certain utilization percentage. If the selected system does not meet the system requirements, control proceeds to Systems Not Considered Remain decision point 422 to determine whether another system is available for evaluation.

If the selected system meets the system requirements at Selected System Meets System Requirements decision point 414, control proceeds to Add Selected System to Set of Eligible Systems step 420. Control then proceeds to Systems Not Considered Remain decision point 422 to determine whether another system is available for evaluation.

In Systems Not Considered Remain decision point 422, a determination is made whether any systems not already considered remain in the cluster. If so, control proceeds to Select System step 410 to select another system. If not, the set of eligible systems is complete and control returns to Size of Set>0 decision point 322 of FIG. 3.

Figure 5:
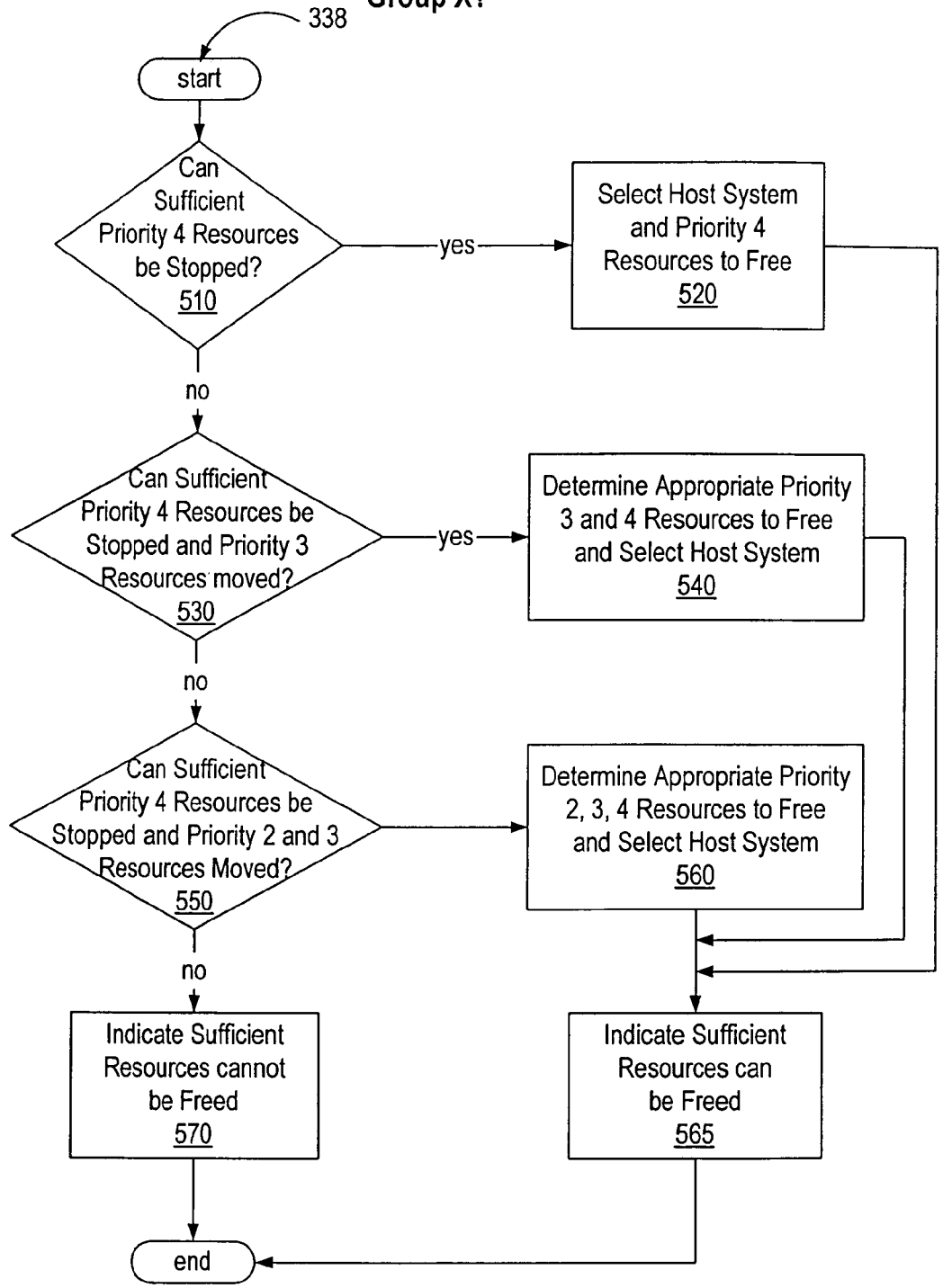
FIG. 5 is a flowchart of the Can Sufficient Capacity and Resources be Freed to Accommodate Application Group X decision point of the flowchart of FIG. 3.

FIG. 5 is a flowchart of the Can Sufficient Capacity and Resources be Freed to Accommodate Application Group X decision point 338 of FIG. 3. The initial decision is made at Can Sufficient Priority 4 Resources be Stopped decision point 510. If sufficient Priority 4 resources can be stopped, control proceeds to Select Host System and Priority 4 Resources to Free step 520. In this step, a system with sufficient Priority 4 resources is selected as the system to host application group X. Control proceeds to Indicate Sufficient Resources can be Freed step 565. The flowchart of FIG. 5 is completed and an indication that sufficient resources can be freed is made.

If at Can Sufficient Priority 4 Resources be Stopped decision point 510, sufficient Priority 4 resources cannot be freed, control proceeds to Can Sufficient Priority 4 Resources be Stopped and Priority 3 Resources Moved decision point 530. If priority 4 applications can be stopped and sufficient resources for Application Group X freed on a system by moving priority 3 applications to other systems, then control proceeds to Determine Appropriate Priority 3 and 4 Resources to Free and Select Host System step 540. At Determine Appropriate Priority 3 and 4 Resources to Free and Select Host System step 540, the decision of which priority 4 applications to stop and which priority 3 applications to move is made. Preferably, when several different scenarios can free the necessary resources, a configuration can be selected such that a minimum number of resources are stopped and/or moved to enable the largest number of high-priority applications to run. Control then proceeds to Indicate Sufficient Resources can be Freed step 565. The flowchart of FIG. 5 is completed and an indication that sufficient resources can be freed is made.

If at Can Sufficient Priority 4 Resources be Stopped and Priority 3 Resources Moved decision point 530, sufficient resources are not available, control proceeds to Can Sufficient Priority 4 Resources be Stopped and Priority 2 and 3 Resources Moved decision point 550. If so, control proceeds to Determine Appropriate Priority 2, 3 and 4 Resources to Free and Select Host System step 560. Again, preferably minimal resources are stopped and moved to enable the largest number of high-priority applications to run. Control then proceeds to Indicate Sufficient Resources can be Freed step 565. The flowchart of FIG. 5 is completed and indication that sufficient resources can be freed is made.

If at Determine Appropriate Priority 2, 3 and 4 Resources to be Freed and Select Host System step 560, sufficient resources are not available in the cluster, control proceeds to Indicate Sufficient Resources Cannot be Freed step 570. The flowchart of FIG. 5 is completed and an indication that sufficient resources cannot be freed is made.

FIGS. 6 through 16 describe multiple scenarios that are within the scope of the business continuity policy of the present invention.

Figure 6:
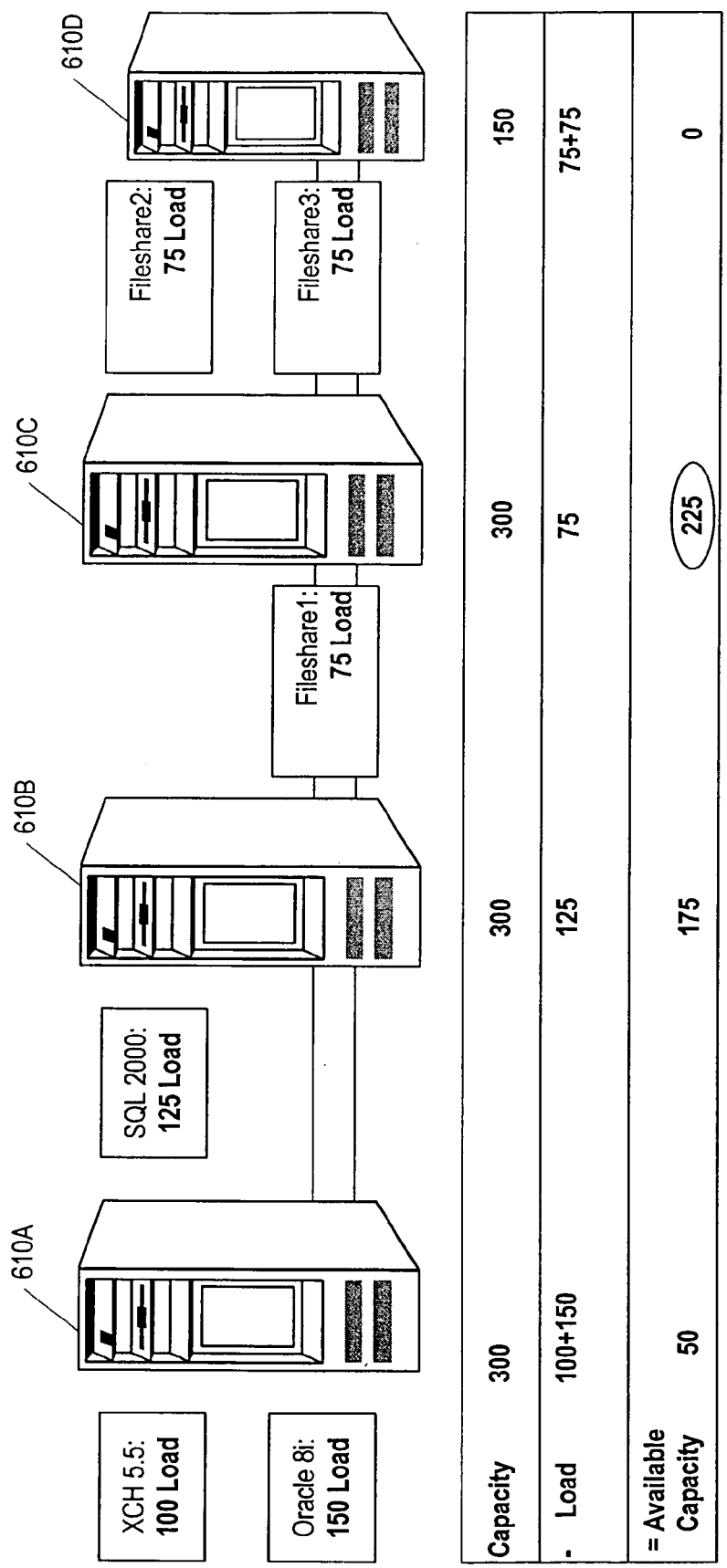
FIGS. 6 through 16 show example configurations and failure scenarios handled by the method and system of the present invention.

FIG. 6 shows the calculation of available capacity for a cluster of servers in a server consolidation environment. Servers 610A, 610B, 610C and 610D form a cluster. Servers 610A, 610B and 610C each have a capacity of 300, and server 610D has a capacity of 150. Server 610A is running Microsoft Exchange (XCH) version 5.5, which places a Load of 100 on server 610A. Server 610A is also running a database application group, Oracle 8i, which places a Load of 150 on server 610A, for a total Load of 250. Server 610B is running SQL 2000 server, which places a Load of 125 on server 610B. Server 610C is running a file sharing application group File-Share1, which places a Load of 75 on Server 610C. Server 610D is running two file sharing application groups, Fileshare2 and Fileshare3, placing a load of 150 on server 610D. By subtracting the respective Load for each application group running on a given server from the Capacity of the given server, Available Capacity is calculated as 50 for server 610A, 175 for server 610B, 225 for server 610C, and zero for server 610D. With an available capacity of 225, server 610C has the highest available capacity in the cluster.

Figure 7:
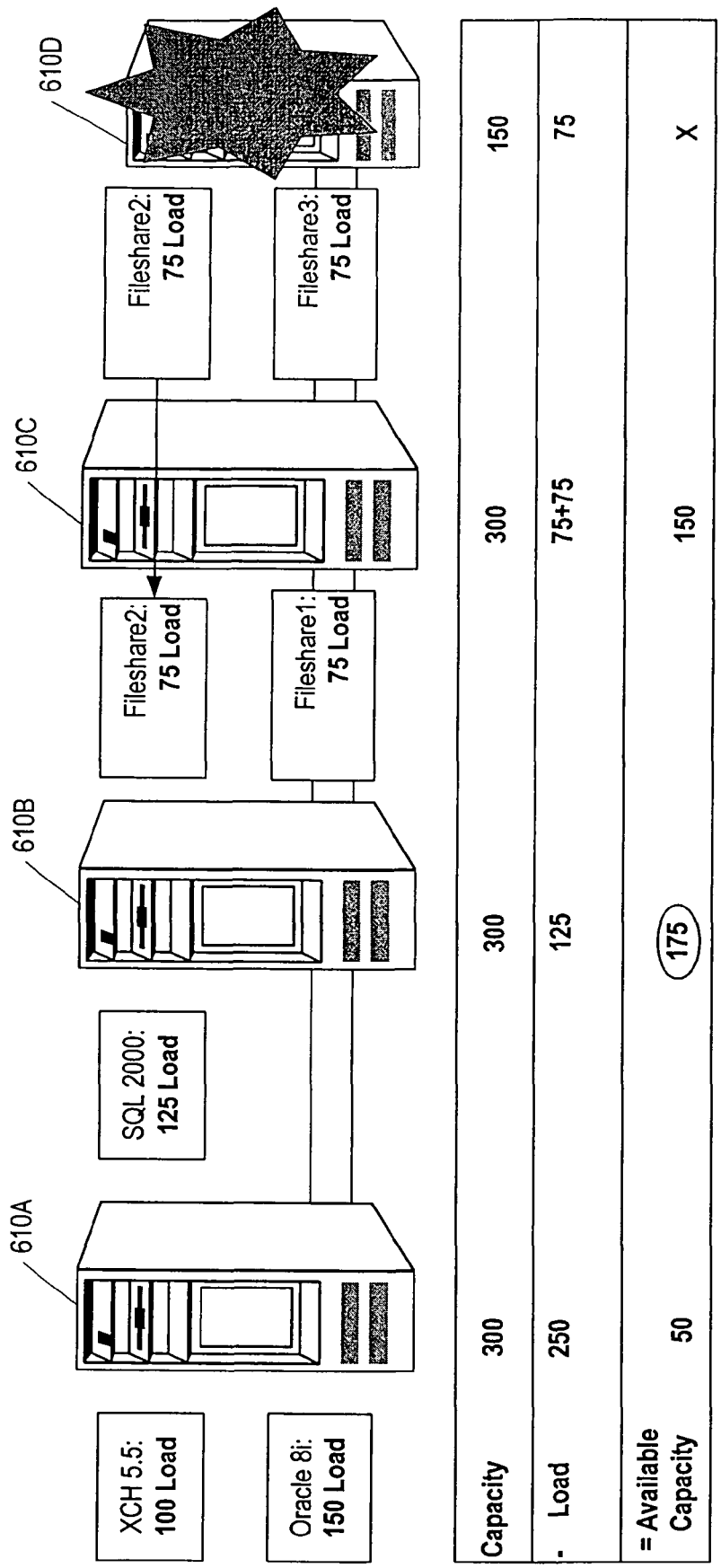

FIG. 7 shows the movement of an application upon failure of one of the servers of FIG. 6 and the resulting available capacity in the cluster. Server 610D fails, leaving file sharing applications Fileshare1 and Fileshare2 to be redistributed if possible to other servers in the cluster. FIG. 7 shows the movement of Fileshare2 to server 610C, which is selected because server 610C offers the highest available capacity. As a result of the movement of Fileshare2 to server 610C, the Load on server 610C increases to 150, and the available capacity of server 610C reduces to 150. Server 610B, with an available capacity of 175, now has the highest available capacity in the cluster.

Figure 8:
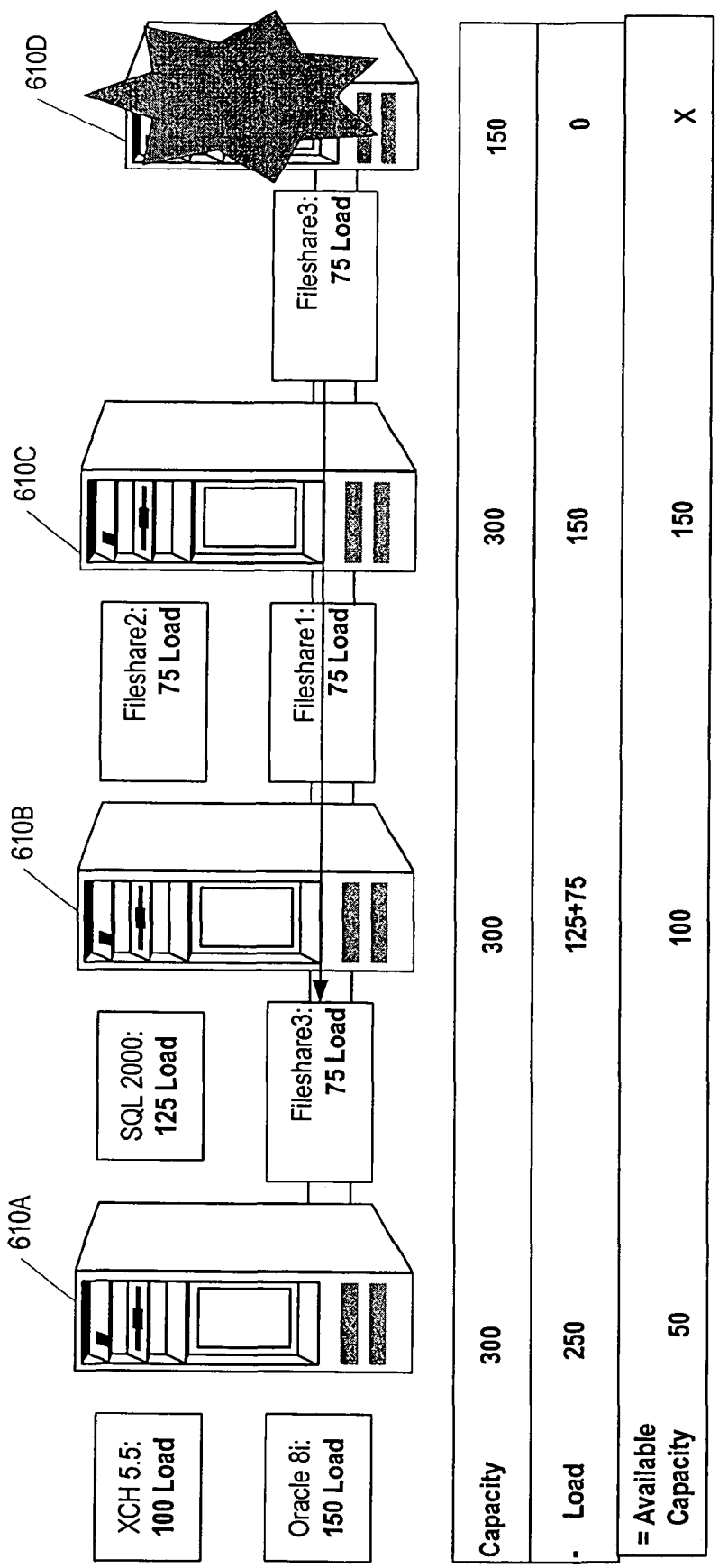

FIG. 8 shows the movement of another application in the failure scenario of FIG. 7. Fileshare3 is moved from server 610D to the server having the highest available capacity, server 610B. As a result of this move, the Load placed on server 610B is increased to 200 and the available capacity of server 610B is reduced to 100.

Figure 9:
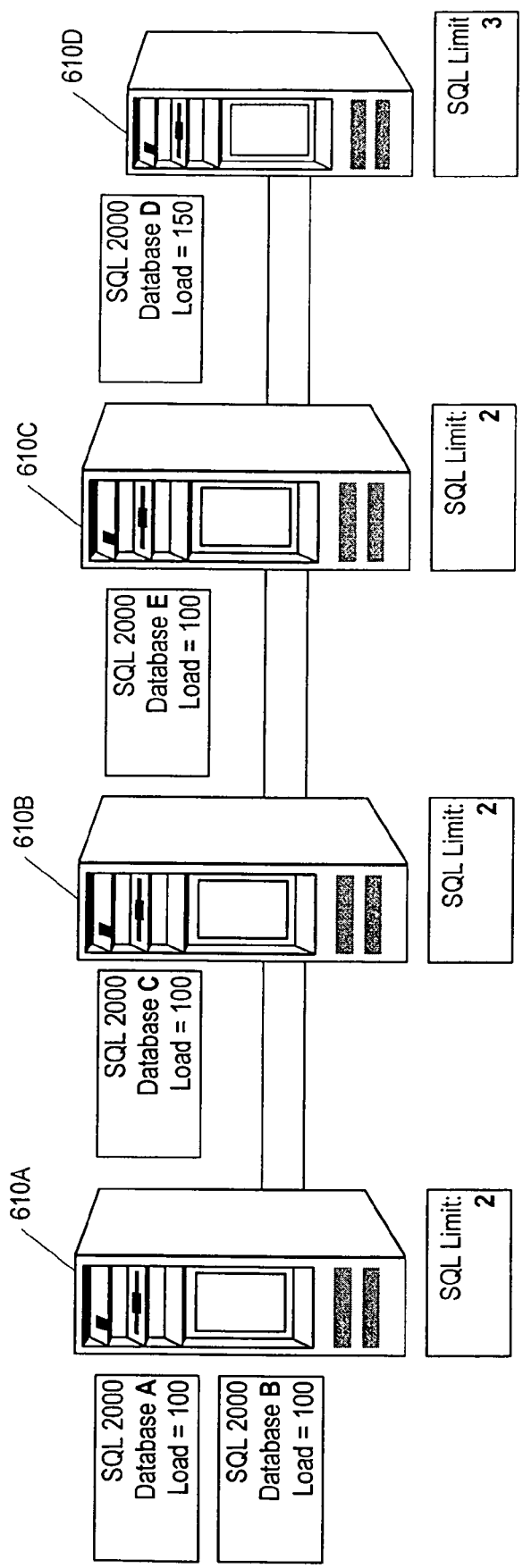

FIG. 9 shows an example configuration of database applications in the cluster of FIG. 6, with each of servers 610A through 610D configured with a capacity of 300. Server 610A is running two SQL 2000 database application groups, SQL 2000 Database A and SQL 2000 Database B. Each of SQL 2000 Database A and SQL 2000 Database B places a load of 100 on server 610A. Server 610A is configured with an SQL limit of 2, indicating that server 610A can run no more than two SQL databases at one time. The available capacity on server 610A is 300−200=100.

Server 610B similarly has a SQL limit of 2 and is running SQL 2000 Database C, placing a load of 100 on server 610B. Server 610B has an available capacity of 200. Server 610C is running SQL 2000 Database E, placing a load of 100 on server 610C. Server 610C also has an available capacity of 200. Server 610D has a SQL limit of 3 and is running SQL 2000 Database D, which places a Load of 150 on server 610D. Server 610D has an available capacity of 150.

Figure 10:
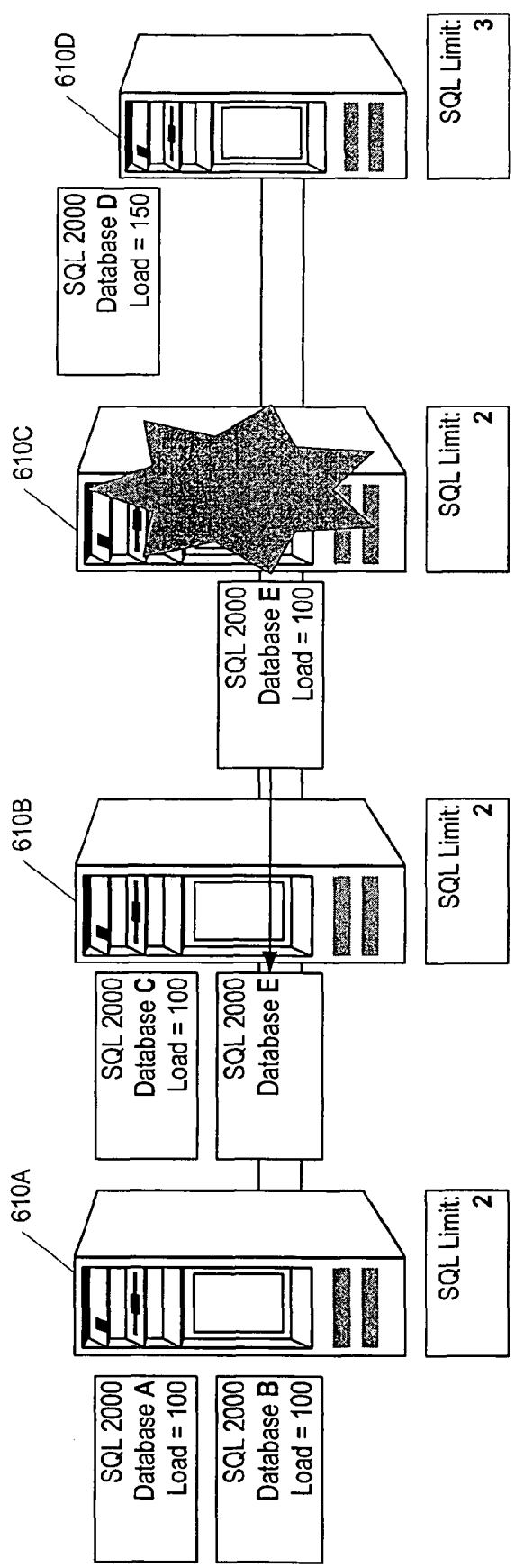

FIG. 10 shows movement of database applications in a failure scenario in the configuration of FIG. 9. Server 610C fails, leaving SQL 2000 Database E to be restarted on another server. SQL 2000 Database E places a Load of 100 on a server. Server 610A cannot host SQL 2000 Database E because sever 610A has already reached its limit of 2 server SQL applications. Neither server 610B or server 610D has reached its limit of the number of SQL applications that it can host, and both server 610B and server 610D have sufficient available capacity to run SQL 2000 Database E. In the example scenario shown, server 610B is selected because, of the two eligible systems, server 610B has the highest available capacity. After SQL 2000 Database E is moved, the load placed on server 610B increases to 200 and the available capacity of server 610B reduces to 100.

Figure 11:
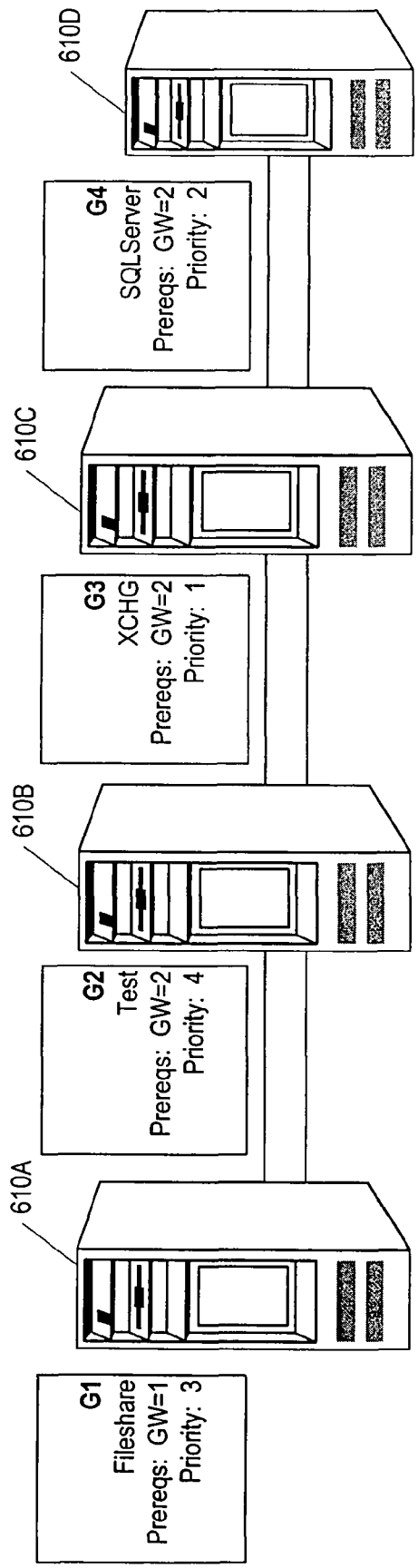

FIG. 11 shows an example of managing application groups using limits and prerequisites. Four application groups are given in this example, including application group G1, a file sharing application; application group G2, a test application; application group G3, a Microsoft Exchange application; and application group G4, a SQL server application group. Application group G1, a priority three application group, requires that a GroupWeight variable for the server have a value of 1 before application group G1 can be run on that server. Application group G2, a priority four application group, requires that a GroupWeight variable for the server have a value of 2 before application group G2 can be run on that server. Application group G3, a priority one application group, requires that a GroupWeight variable for the server have a value of 2 before application group G3 can be run on that server. Finally, application group G4, a priority two application group, requires that a GroupWeight variable for the server have a value of 2 before application group G4 can be run on that server.

Servers 610A through 610D run applications G1 through G4, respectively. With these running application groups, servers 610A through 610D have Limits of 2, 3, 2 and 3, respectively. Servers 610A through 610D have CurrentLimits values of 1, 1, 0, and 1, respectively.

Figure 12:
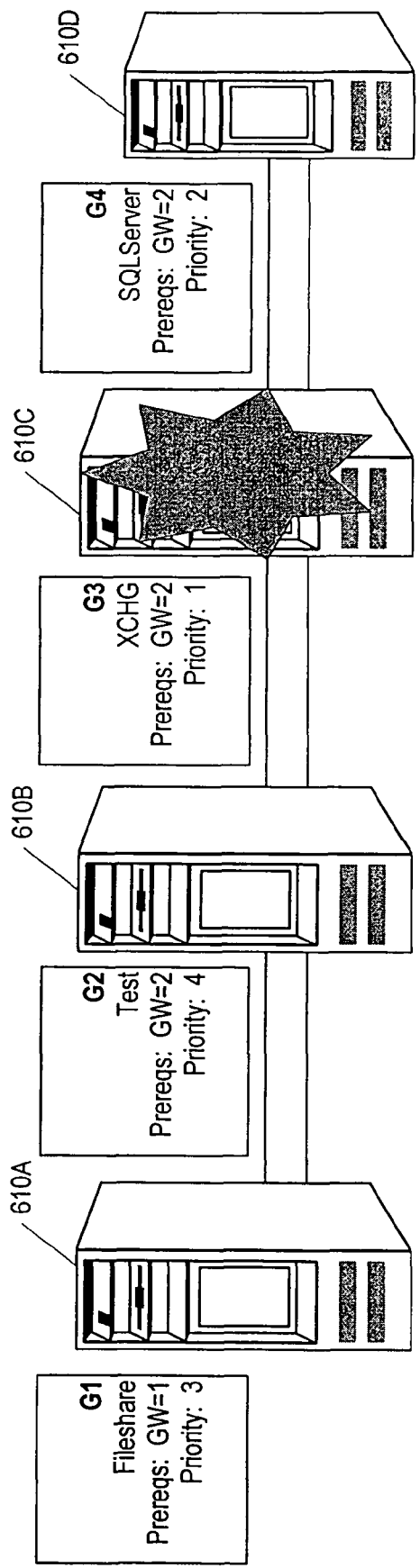

FIG. 12 shows a failure scenario in which an application group cannot be failed over.

Server 610C fails, and no server has a CurrentLimits value of 2, which is a prerequisite for application group G3 to be started on another server. When an application group cannot be failed over, priorities of the running applications are examined to determine whether sufficient resources can be freed in the cluster to run the application group. Application group G3 is a priority one application, and each of application groups G2 through G4 is a lower priority application group. First, a determination is made whether sufficient priority 4 resources exist to free sufficient resources for application group G3. Application group G2 is a priority 4 resource, and it consumes two GroupWeight units. If application group G2 is freed, the two GroupWeight units necessary to run application group G3 are freed, and application group G3 can be started on server 610B.

Figure 13:
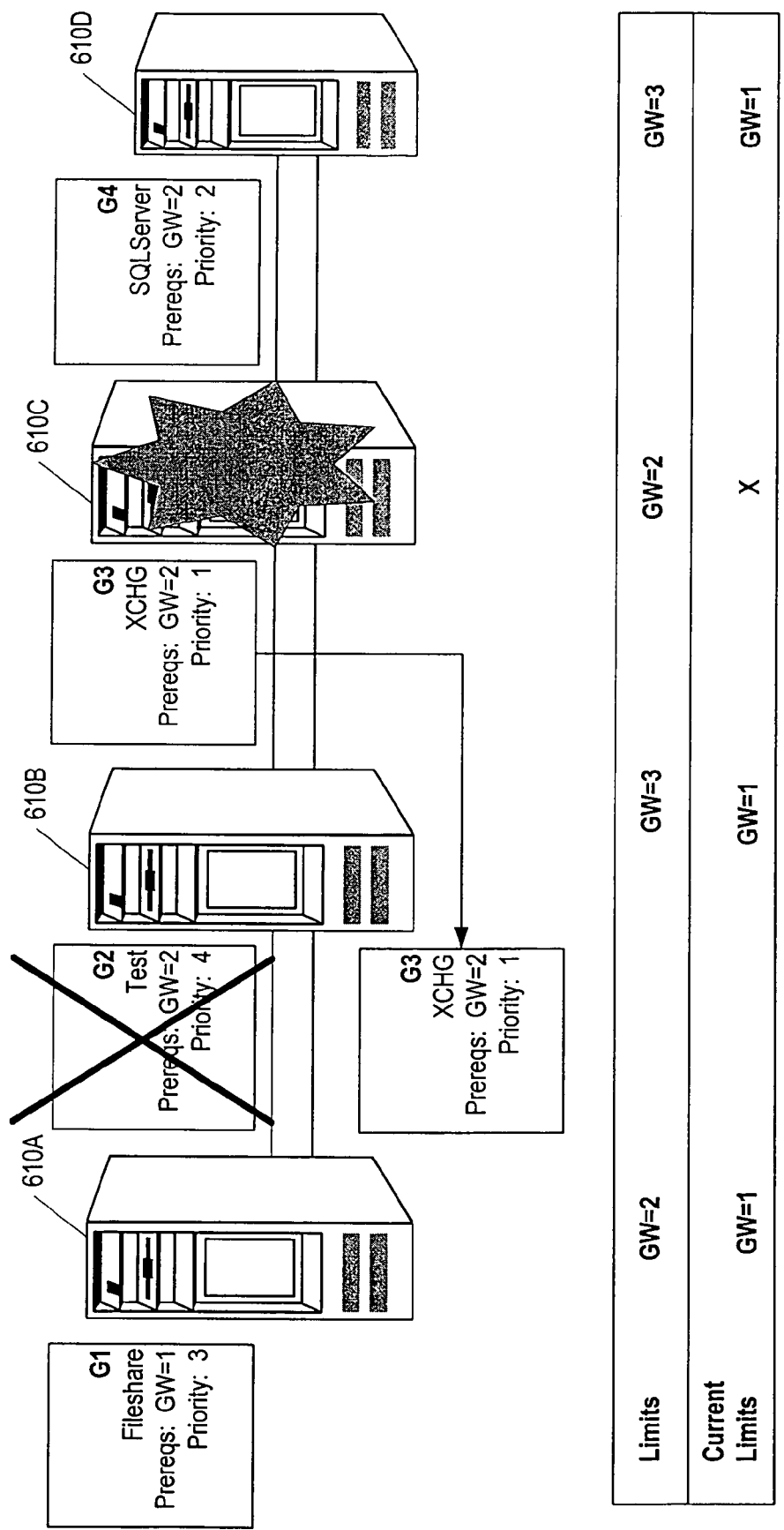

FIG. 13 shows stopping a lower-priority application group to free sufficient resources to enable a higher-priority application group to remain available. In the scenario of FIG. 12, application group G2 was determined to provide sufficient resources to allow application group G3 to run. Application group G2 is stopped, and application group G3 is moved to server 610B. The CurrentLimits value for server 610B is recalculated, now having a value of 1.

Figure 14:
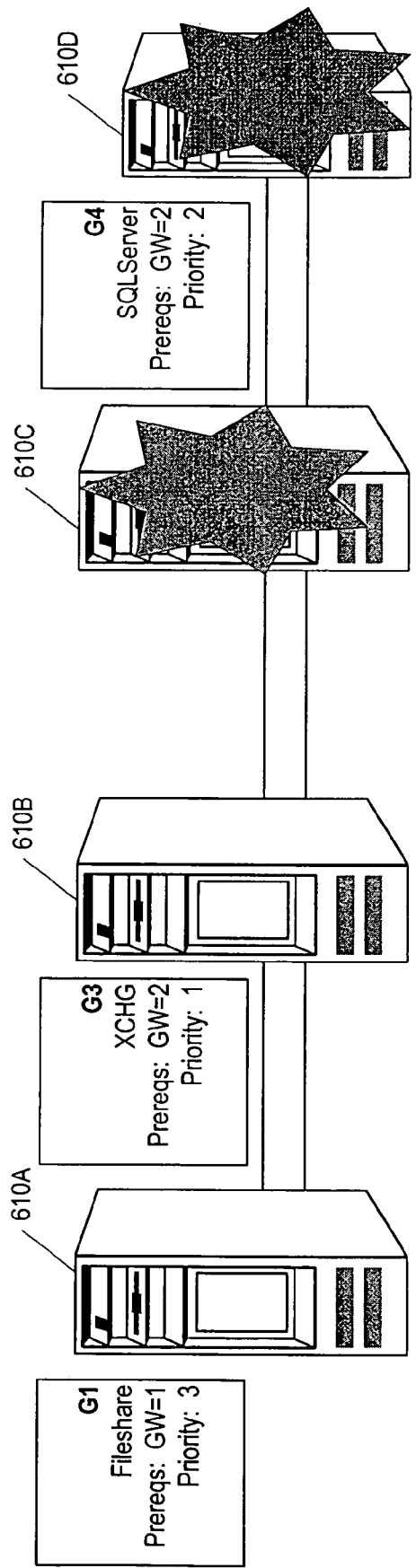

FIG. 14 shows another failure scenario for the configuration of FIGS. 12 and 13. Assume that now server 610D fails, leaving application G4 to be restarted. Application group G4 requires a GroupWeight value of 2 to be started on another server. Neither of the remaining servers 610A or 610B provides a GroupWeight value of 2. A determination is then made whether Sufficient resources can be freed to enable application group G4 to remain available. Lower priority resources are examined to make this determination.

Figure 15:
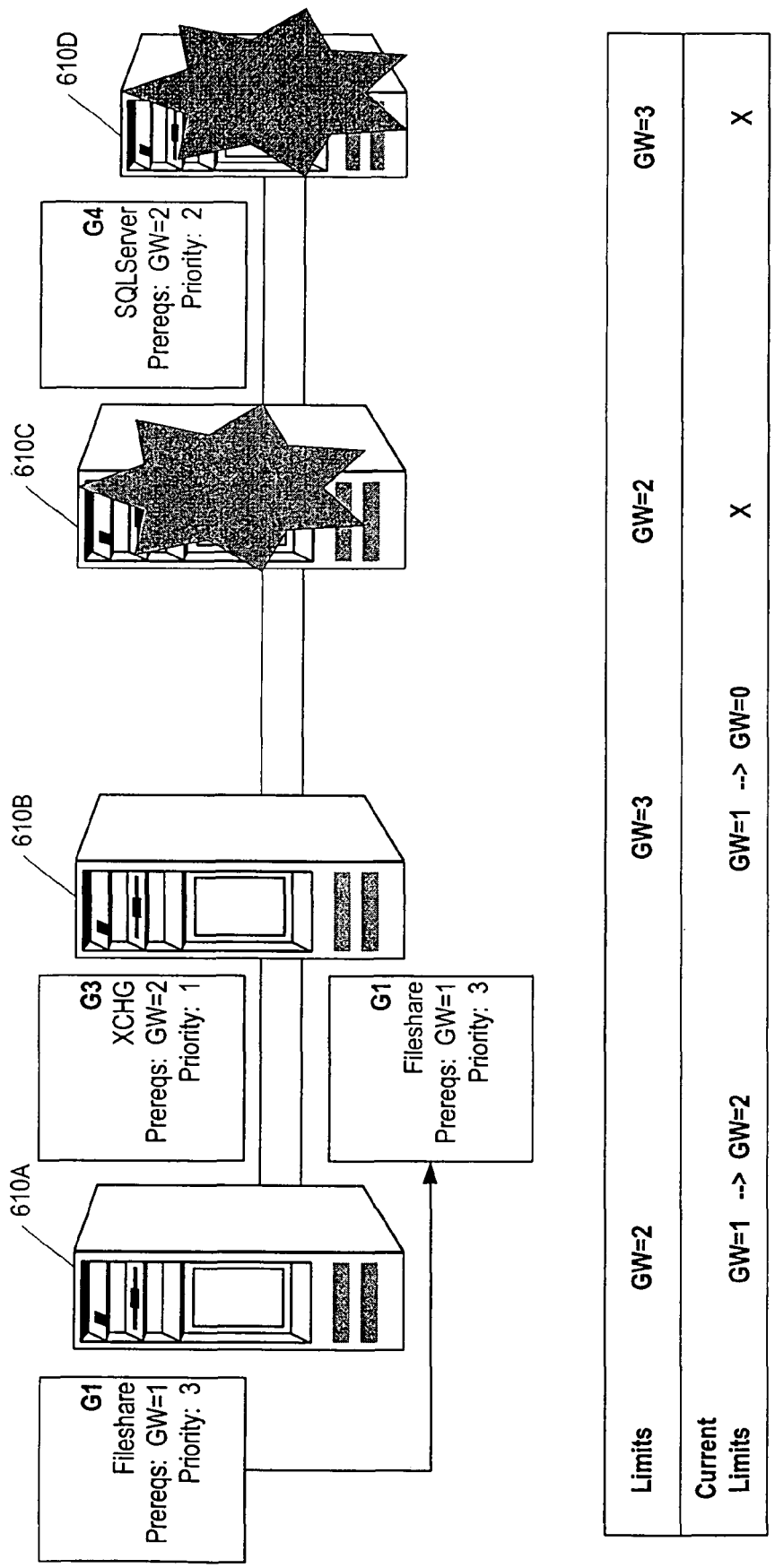

FIG. 15 shows movement of a lower-priority application group to free sufficient resources to enable a higher-priority application group to remain available. Application group G1, a priority three application, has a lower priority than application group G4, with a priority of two. Furthermore, by moving application group G1, the value of GroupWeight for server 610A can be raised to two, which meets the prerequisite for application group G4. The prerequisites for application group G1 are a GroupWeight value of 1, which is provided by server 610B. Application group G1 is moved to server 610B to free resources on server 610A. The result of the movement is that server 610A has a GroupWeight value of 2, and server 610B has a GroupWeight value of zero.

Figure 16:
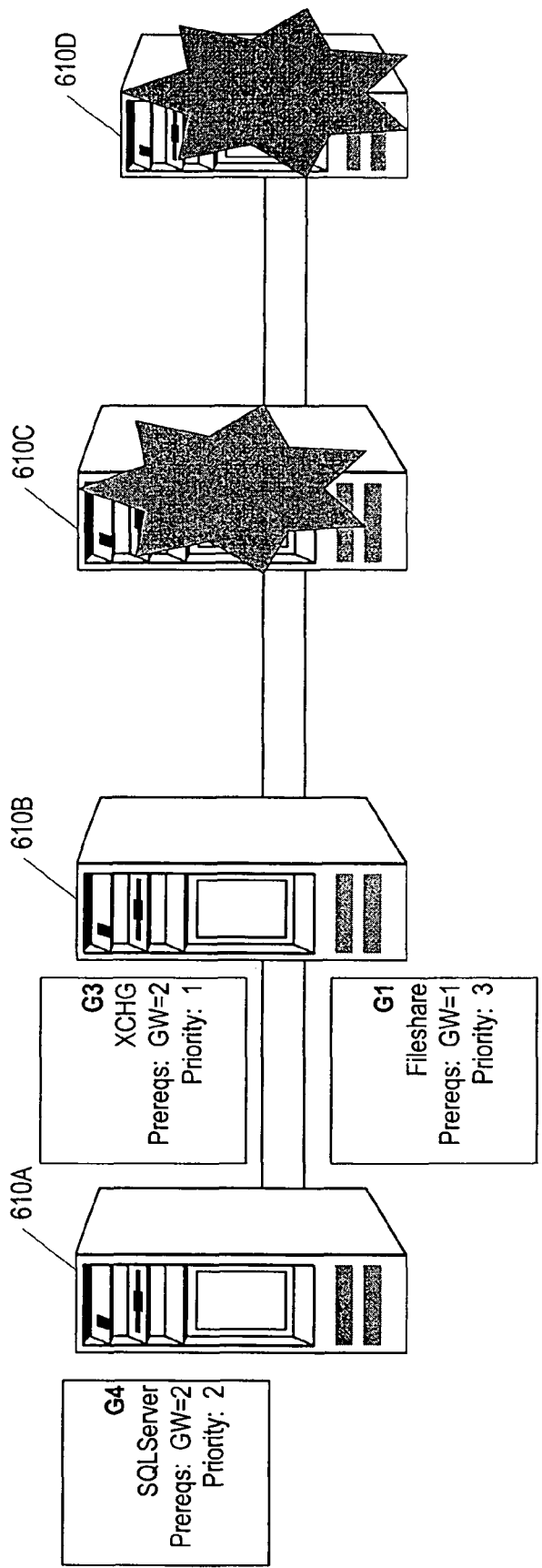

FIG. 16 shows movement of the higher-priority application group to use the resources freed as a result of the action shown in FIG. 15. After the movement of application group G1, server 610A has sufficient resources to host application group G4. The prerequisite for application group G4, that Group-Weight have a value of 2, is true. After the movement of application group G4, server 610A has a GroupWeight value of zero.

The above scenarios are examples of multiple failure situations that can be handled by the business continuity policy described herein. Many variations of these scenarios, and alternative variables for implementing the business continuity policy, are envisioned as part of the present invention and fall within its scope. Further example scenarios are provided in Appendix A.

Resource Manager Integration

Most major operating systems have a corresponding resource manager, such as Solaris resource manager, HP Process Resource Manager and AIX Resource manager. These resource managers, collectively called xRM here, allow an administrator to control CPU and memory utilization. However, typically xRM packages are only aware of the system on which the xRM package is running, and not of other systems within the cluster. Preferably, a cluster management application supporting the business continuity policy of the present invention is integrated with xRM packages and controls resource utilization, and therefore Load, on all systems in the cluster.

Each operating system vendor provides a different interface and different capabilities in the platform's resource manager. For example, Solaris 9 supports the concept of a "Task-ID," which ties a specific process launched under the Task-ID to limits imposed in a "projects" database. To maintain maximum flexibility and keep operations across the operating system platforms identical, a cluster management application provides an API layer to communicate with the various xRM packages. At a minimum, the Load FailOver policy can be used. If the cluster management application is also running on an operating system platform capable of xRM integration, then full enforcement of Load and Limits is possible.

In one embodiment, administrators can configure resource utilization parameters once in the cluster definition, rather than on individual systems. The cluster management application, in conjunction with xRM-specific agents on each system, controls resource allocation to specific application groups when the application groups are started on a system. This allows a single point of administration as well as greater control of load distribution in the cluster.

By changing values for application group Load, the administrator sets both the overall load an application group is expected to place on a system, as well as the share of a system the application group is expected to receive. For example, if three application groups with a Load of 200 each were running on a server with a capacity of 800, each application group effectively receives ⅓ of the available resources. In this scenario, raising the Load value for a specific application group to 400 accomplishes several things. First, raising the load value increases the resource allocation for the modified application group. This application group receives 50% of available CPU and memory, and the remaining two application groups receive 25% each. Second, raising the Load Value places the server at a 100% load level, reducing AvailableCapacity to 0. This situation produces an overload warning. Raising a Load value not only tells the cluster management application that a system is loaded more heavily, it also functions to increase the performance of the application.

Modeling and Simulation Engine

A modeling and simulation engine (MSE) can provide the capability for the cluster management application to determine the best possible configuration for application groups based on a "what-if" model. Rather than choose a system based solely on current load and limits, the cluster management application determines how to reconfigure the cluster to provide application groups with the best possible performance. Re-configuration takes into account the various application group priorities to determine the application groups that can and cannot be moved. Various parameters can also be supplied to the MSE, such as "maximum performance" and "minimum switches," to allow the cluster management application to determine whether to perform a cluster reconfiguration to maximize performance, or whether to minimize downtime for application groups.

The MSE can also include simulation capabilities to allow administrators to run a complete what-if scenario for any cluster reconfiguration. For example:

What if I take 32 CPU server-1 out of the cluster? What is the best performance reconfiguration model? What applications will be stopped due to the shutdown? What applications will be stopped due to reconfiguration moves? What if I allow Priority 1moves during this evolution?

What if I add an additional four 16-CPU commodity servers to my cluster and storage area network? What is the best performance configuration? What applications will be stopped during the move? How much spare capacity will this configuration provide?

I want to online a large database. Where is the best location? What reconfiguration would provide the best fit?

The MSE can rigidly enforce the current concepts of Load and Limits, and also allows reconfiguration to better utilize the FailOver Policy. For example, to add a large database (shared memory and semaphores X2) and no system has adequate capacity within the Limits, the proposed FailOver Policy provides an error. The MSE could determine that two systems provide available adequate resources, but each is running a small database (shared memory and semaphores. The cluster management application can recommend a consolidation of the two smaller databases to one server and free the second server for the large database.

Cluster Reconfiguration

Cluster Reconfiguration, either manual or automatic, refers to the capability provided by the cluster management application to re-allocate application groups, and therefore loads across the cluster, to better balance system Load. This reconfiguration can be in response to a failure, server additions and deletions, or application group additions or removals. Cluster reconfiguration can be performed by an MSE component of the cluster management application to allocate fixed cluster resources. The cluster reconfiguration module can be allowed to perform automatically if moving Priority 3 and Priority 4 application groups, and possibly automatically on Priority 2 application groups if specific parameters are set and manual (operator-acknowledged) for Priority 1 groups.

Cluster reconfiguration capabilities can intervene when a manual application group online or switchover is requested. If a user requests to move or bring an application group online, the MSE can inform the user that it is acceptable or recommend a reconfiguration sequence to better allocate resources.

System Suitable for Implementing the Present Invention

Figure 17:
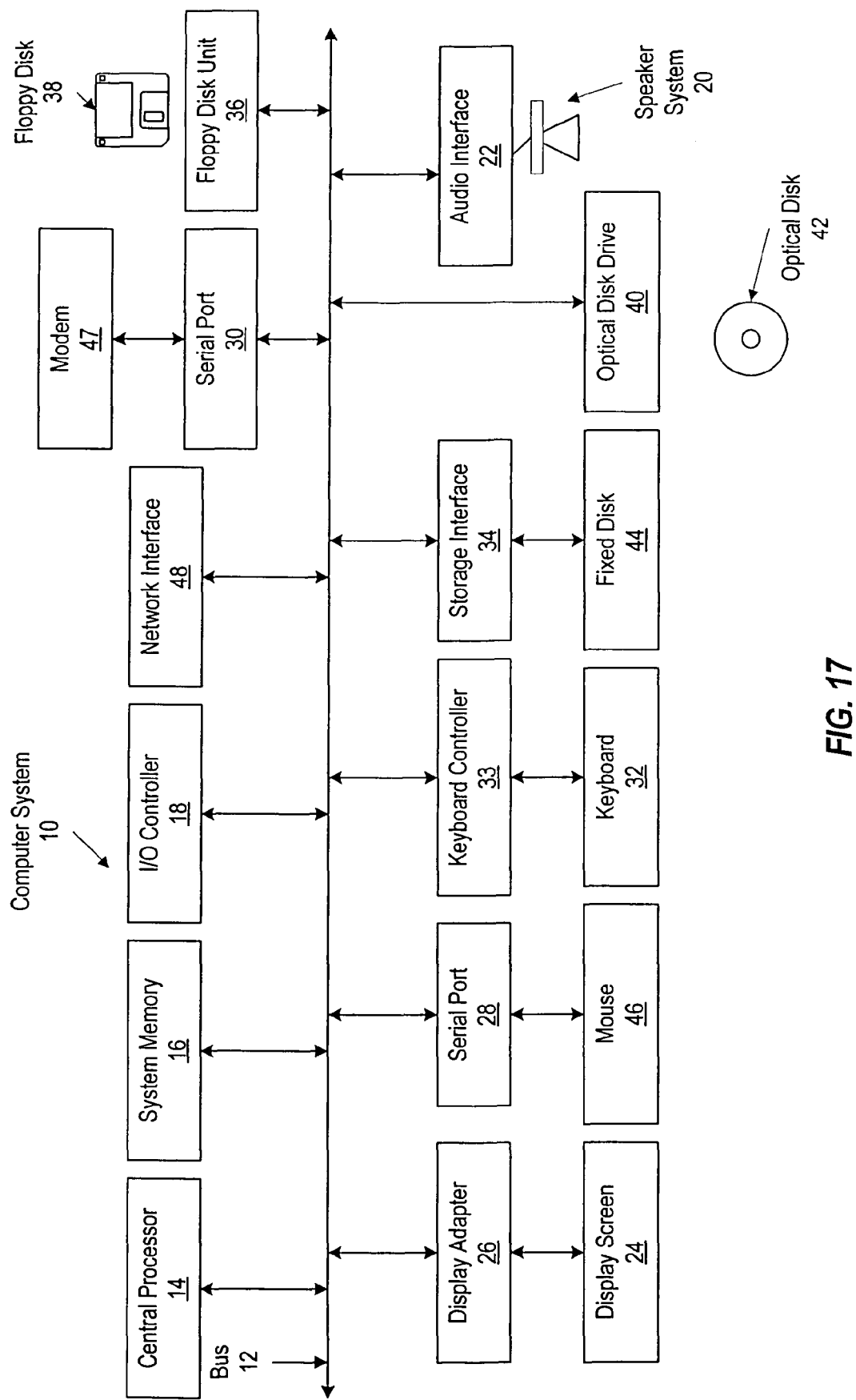
FIG. 17 is a block diagram illustrating a computer system suitable for implementing embodiments of the present invention.

FIG. 17 depicts a block diagram of a computer system 10 suitable for implementing the present invention. Computer system 10 includes a bus 12 which interconnects major subsystems of computer system 10 such as a central processor 14, a system memory 16 (typically RAM, but which may also include ROM, flash RAM, or the like), an input/output controller 18, an external audio device such as a speaker system 20 via an audio output interface 22, an external device such as a display screen 24 via display adapter 26, serial ports 28 and 30, a keyboard 32 (interfaced with a keyboard controller 33), a storage interface 34, a floppy disk drive 36 operative to receive a floppy disk 38, and a CD-ROM drive 40 operative to receive a CD-ROM 42. Also included are a mouse 46 (or other point-and-click device, coupled to bus 12 via serial port 28), a modem 47 (coupled to bus 12 via serial port 30) and a network interface 48 (coupled directly to bus 12).

Bus 12 allows data communication between central processor 14 and system memory 16, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Applications resident with computer system 10 are generally stored on and accessed via a computer readable medium, such as a hard disk drive (e.g., fixed disk 44), an optical drive (e.g., CD-ROM drive 40), floppy disk unit 36 or other storage medium. Additionally, applications may be in the form of electronic signals modulated in accordance with the application and data communication technology when accessed via network modem 47 or interface 48.

Storage interface 34, as with the other storage interfaces of computer system 10, may connect to a standard computer readable medium for storage and/or retrieval of information, such as a fixed disk drive 44. Fixed disk drive 44 may be a part of computer system 10 or may be separate and accessed through other interface systems. Many other devices can be connected such as a mouse 46 connected to bus 12 via serial port 28, a modem 47 connected to bus 12 via serial port 30 and a network interface 48 connected directly to bus 12. Modem 47 may provide a direct connection to a remote server via a telephone link or to the Internet via an internet service provider (ISP). Network interface 48 may provide a direct connection to a remote server via a direct network link to the Internet via a POP (point of presence). Network interface 48 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 17 to be present to practice the present invention. The devices and subsystems may be interconnected in different ways from that shown in FIG. 17. The operation of a computer system such as that shown in FIG. 17 is readily known in the art and is not discussed in detail in this application. Code to implement the present invention may be stored in computer-readable storage media such as one or more of system memory 16, fixed disk 44, CD-ROM 42, or floppy disk 38. Additionally, computer system 10 may be any kind of computing device, and so includes personal data assistants (PDAs), network appliances, X-window terminals or other such computing devices. The operating system provided on computer system 10 may be MS-DOS®, MS-WINDOWS®, OS/2®, UNIX®, Linux® or other known operating system. Computer system 10 also supports a number of Internet access tools, including, for example, an HTTP-compliant web browser having a JavaScript interpreter, such as Netscape Navigator® 3.0, Microsoft Explorer® 3.0 and the like.

Moreover, regarding the messages and/or data signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that in fact many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

Appendix A

EXAMPLES

The following example uses Limits and Prerequisites to control the total number of application groups that may run on a system. The cluster consists of four similar servers. There are five application groups, which are roughly equivalent in requirements for processing power and in the amount of Load each application group requires of a system. Each server can host two such application groups. This example does not use application group Load and system Capacity. Also, the application groups use a default AutoStartPolicy and FailOverPolicy.

Example Configuration File with Limits

```
system Svr1 (
    Limits = {GroupWeight = 2}
)
system Svr2 (
    Limits = {GroupWeight = 2}
)
system Svr3 (
    Limits = {GroupWeight = 2}
)
system Svr4 (
    Limits = {GroupWeight = 2}
)
group G1 (
    SystemList = { Svr1, Svr2, Svr3, Srv4}
    AutoStartList = { Svr1, Svr2 }
    Prerequisites = { GroupWeight = 1 }
)
group G2 (
    SystemList = { Svr1, Svr2, Svr3, Svr4}
    AutoStartList = { Svr2, Svr3 }
    Prerequisites = { Group Weight = 1 }
)
group G3 (
    SystemList = { Svr1, Svr2, Svr3, Svr4}
    AutoStartLisi = {Svr3, Svr4 }
    Prerequisites = { GroupWeight = 1 }
)
group G4 (
    SystemList = { Svr1, Svr2, Svr3, Svr4}
    AutoStartList = { Svr4, Svr1 }
    Prerequisites = { GroupWeight = 1 }
)
group G5 (
    SystemList = { Svr1, Svr2, Svr3, Svr4}
    AutoStartList = { Svr2, Svr3 }
    Prerequisites = { GroupWeight = 1 }
)
```

AutoStart Operation

This example uses the default AutoStartPolicy=Order. Application groups are brought online on the first system available in the AutoStartList. In this way, G1 will start on Svr1, G2 on Svr2, and so on. G5 will start on Svr2.

Normal Operation

An example cluster configuration (assuming all systems are running) is provided below:
Svr1
CurrentLimits={GroupWeight=1}
(Group G1)
Svr2
CurrentLimits={GroupWeight=0}
(Groups G2 and G5)
Svr3
CurrentLimits={GroupWeight=1}
(Group G3)
Svr4
CurrentLimits={GroupWeight=1}
(Group G4)

Failure Scenario

In the first failure scenario, assume Svr2 fails. With application groups G2 and G5 configured with an identical SystemList, both application groups can run on any system. The cluster management application can serialize the choice of failover nodes for the two groups. G2, being canonically first, is started on Svr1, the lowest priority in the SystemList, thereby exhausting the Limits for Svr1. G5 is then started on the next system in the order of the SystemList for group G5. G5 goes online on Svr3. Following the first failure, the cluster now looks like the following:
Svr1
CurrentLimits={GroupWeight=0}
(Groups G1 and G2)
Svr3
CurrentLimits={GroupWeight=0}
(Groups G3 and G5)
Svr4
CurrentLimits={GroupWeight=1}
(Group G4)

Cascading Failures

Assuming Svr2 cannot immediately repaired, the cluster can tolerate the failure of an individual application group on Svr1 or Svr3, but no further node failures.

Load-Based Example

The following sample cluster shows the use of simple load based startup and failover. SystemZones, Limits and Prerequisites are not used.

The cluster consists of four identical systems, each with the same capacity. Eight application groups, G1-G8, with various loads run in the cluster.

```
Configuration File
    include "types.cf"
    cluster SGWM-demo
system Svr1 (
    Capacity = 100
)
system Svr2 (
    Capacity = 100
)
system Svr3 (
    Capacity = 100
)
system Svr4 (
    Capacity = 100
)
group G1 (
    SystemList = { Svr1, Svr2, Svr4, Svr4 }
    AutoStartPolicy = Load
    AutoStartList = { Svr1, Svr2, Svr3, Svr4 }
    FailOverPolicy = Load
    Load = 20
)
group G2 (
    SystemList = { Svr1, Svr2, Svr4, Svr4 }
    AutoStartPolicy = Load
    AutoStartList = { Svr1, Svr2, Svr3, Svr4 }
    FailOverPolicy = Load
    Load = 40
)
group G3 (
    SystemList = { Svr1, Svr2, Svr4, Svr4 }
    AutoStartPolicy = Load
    AutoStartList = { Svr1, Svr2, Svr3, Svr4 }
    FailOverPolicy = Load
    Load = 30
)
group G4 (
    SystemList = { Svr1, Svr2, Svr4, Svr4 }
    AutoStartPolicy = Load
    AutoStartList = { Svr1, Svr2, Svr3, Svr4 }
    FailOverPolicy = Load
    Load = 10
)
group G5 (
    SystemList = { Svr1, Svr2, Svr4, Svr4 }
    AutoStartPolicy = Load
    AutoStartList = { Svr1, Svr2, Svr3, Svr4 }
    FailOverPolicy = Load
    Load = 50
)
```

-continued

```
group G6 (
    SystemList = { Svr1, Svr2, Svr4, Svr4 }
    AutoStartPolicy = Load
    AutoStartList = { Svr1, Svr2, Svr3, Svr4 }
    FailOverPolicy = Load
    Load = 30
    )
group G7 (
    SystemList = { Svr1, Svr2, Svr4, Svr4 }
    AutoStartPolicy = Load
    AutoStartList = { Svr1, Svr2, Svr3, Svr4 }
    FailOverPolicy = Load
    Load = 20
    )
group G8 (
    SystemList = { Svr1, Svr2, Svr4, Svr4 }
    AutoStartPolicy = Load
    AutoStartList = { Svr1, Svr2, Svr3, Svr4 }
    FailOverPolicy = Load
    Load = 40
    )
```

AutoStart Operation

As mentioned above, application groups can be placed in a queue as soon as they are started on a system. For the purposes of this example, application groups are placed into the queue in the same order that the application groups are described, G1 through G8.

G1 is started on the system with the highest AvailableCapacity. Since the systems are equal, Svr1 is chosen since it is canonically first. G2-G4 start on Svr2 through Svr4. At this time, with the first 4 group startup decisions made, the cluster looks as follows:

Svr1
AvailableCapacity=80
Svr2
AvailableCapacity=60
Svr3
AvailableCapacity=70
Svr4
AvailableCapacity=90

As the remaining application groups are brought online, G5 starts on Svr4, as it has the highest AvailableCapacity. G6 are brought starts on Svr1, with 80 remaining. G7 starts on Svr3, with AvailableCapacity=70. G8 starts on Svr2, with AvailableCapacity=60.

Normal Operation

The final cluster configuration (assuming the original queue of G1-G8) is shown below:

Svr1
AvailableCapacity=50
(Groups G1 and G6)
Svr2
AvailableCapacity=20
(Groups G2 and G8)
Svr3
AvailableCapacity=50
(Groups G3 and G7)
Svr4
AvailableCapacity=40
(Groups G4 and G5)

In this configuration, an overload warning is provided for Svr2 after the default 900 seconds since Svr2 has a default LoadWarningLevel of 80%.

Failure Scenario

In the first failure scenario, assume Svr4 fails, immediately queuing G4 and G5 for failure,decision. G4 starts on Svr1, as Svr1 and Svr3 have AvailableCapacity=50 and Svr1 is canonically first. G5 goes online on Svr3. Svr1 Failure decisions are made serially, actual online and offline operations are not. Serializing the failover choice allows complete load-based control, and, in one embodiment, adds less than one second to total failover time.

Following the first failure, the cluster configuration is shown below:

Svr1
AvailableCapacity=40
(Groups G1, G6 and G4)
Svr2
AvailableCapacity=20
(Groups G2 and G8)
Svr3
AvailableCapacity=0
(Groups G3, G7 and G5)

In this configuration, an overload warning is provided for Svr3 to notify an operator or administrator that Svr3 is overloaded. The operator can switch G7 to Svr1 to balance loading across G1 and G3. As soon as Svr4 is repaired, Svr4 rejoins the cluster with an AvailableCapacity=100. Svr4 can then server as a failover target for further failures.

Cascading Failures

Assuming Svr4 is not immediately repaired, further failures are possible. For this example, assume Svr3 now fails. Each application group G3, G5 and G7 is re-started on respective server Svr1, Svr2, and Svr1 These re-starts result in the following configuration:

Svr1
AvailableCapacity=−10
(Groups G1, G6, G4, G3 and G7)
Svr2
AvailableCapacity=−30
(Groups G2 and G8 and G5)

This example shows that AvailableCapacity is a soft limit, and can fall below zero.

Complex 4-System Example

The following example shows a 4-system cluster using multiple system Capacities and various Limits. The cluster consists of two large Enterprise servers (LgSvr1 and LgSvr2) and two Medium servers (MedSvr1 and MedSvr2). Four application groups, G1 through G4, are provided with various Loads and Prerequisites. G1 and G2 are database application groups, with specific shared memory and semaphore requirements. G3 and G4 are middle-tier application groups with no specific memory or semaphore requirements and simply add load to a given system.

Example Configuration File

```
include "types.cf"
cluster Demo (
    )
system LgSvr1 (
    Capacity = 200
    Limits = { ShrMemSeg=20, Semaphores=100, Processors=12}
    LoadWarningLevel = 90
    LoadTimeThreshold = 600
    )
system LgSvr2 (
    Capacity = 200
    Limits = { ShrMemSeg=20, Semaphores=100, Processors=12 }
    LoadWarningLevel=70
    LoadTimeThreshold=300
    )
system MedSvr1 (
    Capacity = 100
    Limits = { ShrMemSeg=10, Semaphores=50, Processors=6}
    )
```

-continued

```
system MedSvr2 (
    Capacity = 100
    Limits = { ShrMemSeg=10, Semaphores=50, Processors=6 }
)
group G1 (
    SystemList = { LgSvr1, LgSvr2, MedSvr1, MedSvr2 }
    SystemZones = { LgSvr1=0, LgSvr2=0, MedSvr1=1, MedSvr2=1 }
    AutoStartPolicy = Load
    AutoStartList = { LgSvr1, LgSvr2 }
    FailOverPolicy = Load
    Load = 100
    Prerequisites = { ShrMemSeg=10, Semaphores=50, Processors=6 }
)
group G2 (
    SystemList = { LgSvr1, LgSvr2, MedSvr1, MedSvr2 }
    SystemZones = { LgSvr1=0, LgSvr2=0, MedSvr1=1, MedSvr2=1 }
    AutoStartPolicy = Load
    AutoStartList = { LgSvr1, LgSvr2 }
    FailOverPolicy = Load
    Load = 100
    Prerequisites = { ShrMemSeg=10, Semaphores=50, Processors=6 }
)
group G3 (
    SystemList = { LgSvr1, LgSvr2, MedSvr1, MedSvr2 }
    SystemZones = { LgSvr1=0, LgSvr2=0, MedSvr1=1, MedSvr2=1 }
    AutoStartPolicy = Load
    AutoStartList = { MedSvr1, MedSvr2 }
    FailOverPolicy = Load
    Load = 30
)
group G4 (
    SystemList = { LgSvr1, LgSvr2, MedSvr1, MedSvr2 }
    SystemZones = { LgSvr1=0, LgSvr2=0, MedSvr1=1, MedSvr2=1 }
    AutoStartPolicy = Load
    AutoStartList = { MedSvr1, MedSvr2 }
    FailOverPolicy = Load
    Load = 20
)
```

AutoStart Operation

Using the main.cf example above, the following is one possible outcome of the AutoStart operation:

G1—LgSvr1
G2—LgSvr2
G3—MedSvr1
G4—MedSvr2

All application groups are assigned to a system when the cluster starts. Application groups G1 and G2 have an AutoStartList of LgSvr1 and LgSvr2. G1 and G2 are queued to go online on one of these servers, based on highest AvailableCapacity. Assuming G1 starts first, G1 is started on LgSvr1 because LgSvr1 and LgSvr2 both have an initial AvailableCapacity of 200, and LgSvr1 is lexically first.

Application groups G3 and G4 are started, respectively, on MedSvr1 and MedSvr2.

Normal Operation

After starting application groups G1 through G4, the resulting configuration is shown below:

LgSvr1
AvailableCapacity=100
CurrentLimits={ShrMemSeg=10, Semaphores=50, Processors=6}
LgSvr2
AvailableCapacity=100
CurrentLimits={ShrMemSeg=10, Semaphores=50, Processors=6}
MedSvr1
AvailableCapacity=70
CurrentLimits={ShrMemSeg=10, Semaphores=50, Processors=6}
MedSvr2
AvailableCapacity=80
CurrentLimits={ShrMemSeg=10, Semaphores=50, Processors=6}

Failure Scenario

For the first failure example, assume system LgSvr2 fails. The cluster management application scans available systems in G2's SystemList having the same SystemZones grouping as LgSvr2. The cluster management application then creates a subset of systems meeting the application group's Prerequisites. In this case, LgSvr1 meets all necessary Limits. G2 is brought online on LgSvr1, resulting in the following configuration:

LgSvr1
AvailableCapacity=0
CurrentLimits={ShrMemSeg=0, Semaphores=0, Processors=0}
MedSvr1
AvailableCapacity=70
CurrentLimits={ShrMemSeg=10, Semaphores=50, Processors=6}
MedSvr2
AvailableCapacity=80
CurrentLimits={ShrMemSeg=10, Semaphores=50, Processors=6}

After 10 minutes, (LoadTimeThreshold=600) the overload warning on LgSvr1 is provided because LoadWarningLevel exceeds 90%.

Cascading Failure Scenario

In this scenario, a further failure of a system can be tolerated, as each system has remaining Limits sufficient to accommodate the application group running on the peer system.

For example, if a failure were to occur with either MedSvr1 or MedSvr2, the other system would be selected as a failover target, as application groups running on the failed system have MedSvr1 and MedSvr2 in their respective SystemZones.

If a failure instead occurred with LgSvr1, with LgSvr2 still offline, the failover of the application groups G1 and G2 are serialized for the failover decision process. In this case, no systems exist in the database zone. The first group canonically, G1, will be started on MedSvr2, as MedSvr2 meets all Limits and has the highest AvailableCapacity. Group G2 will be started on MedSvr1, as MedSvr1 is the only remaining system meeting the Limits.

Server Consolidation Example

The following example shows a complex 8-node cluster running multiple applications and several large databases. The database servers are all large enterprise systems, LgSvr1, LgSvr2 and LgSvr3. The middle-tier servers running multiple applications are MedSvr1, MedSvr2, MedSvr3, MedSvr4 and MedSvr5.

Example Configuration File
include "types.cf"
cluster Demo (
)
system LgSvr1 (

-continued

```
        Capacity = 200
        Limits = { ShrMemSeg=15, Semaphores=30, Processors=18}
        LoadWarningLevel = 80
        LoadTimeThreshold = 900
        )
system LgSvr2 (
        Capacity = 200
        Limits = { ShrMemSeg=15, Semaphores=30, Processors=18 }
        LoadWarningLevel=80
        LoadTimeThreshold=900
        )
system LgSvr3 (
        Capacity = 200
        Limits = { ShrMemSeg=15, Semaphores=30, Processors=18 }
        LoadWarningLevel=80
        LoadTimeThreshold=900
        )
system MedSvr1 (
        Capacity = 100
        Limits = { ShrMemSeg=5, Semaphores=10, Processors=6}
        )
system MedSvr2 (
        Capacity = 100
        Limits = { ShrMemSeg=5, Semaphores=10, Processors=6 }
        )
system MedSvr3 (
        Capacity = 100
        Limits = { ShrMemSeg=5, Semaphores=10, Processors=6 }
        )
system MedSvr4 (
        Capacity = 100
        Limits = { ShrMemSeg=5, Semaphores=10, Processors=6 }
        )
system MedSvr5 (
        Capacity = 100
        Limits = { ShrMemSeg=5, Semaphores=10, Processors=6 }
        )
group Database1 (
        SystemList = { LgSvr1, LgSvr2, LgSvr3, MedSvr1, MedSvr2, MedSvr3,
                        MedSvr4, MedSvr5 }
        SystemZones = { LgSvr1=0, LgSvr2=0, LgSvr3=0, MedSvr1=1, MedSvr2=1,
                        MedSvr3=1, MedSvr4=1, MedSvr5=1 }
        AutoStartPolicy = Load
        AutoStartList = { LgSvr1, LgSvr2, LgSvr3 }
        FailOverPolicy = Load
        Load = 100
        Prerequisites = { ShrMemSeg=5, Semaphores=10, Processors=6 }
        )
group Database2 (
        SystemList = { LgSvr1, LgSvr2, LgSvr3, MedSvr1, MedSvr2, MedSvr3,
                        MedSvr4, MedSvr5 }
        SystemZones = { LgSvr1=0, LgSvr2=0, LgSvr3=0, MedSvr1=1, MedSvr2=1,
                        MedSvr3=1, MedSvr4=1, MedSvr5=1 }
        AutoStartPolicy = Load
        AutoStartList = { LgSvr1, LgSvr2, LgSvr3 }
        FailOverPolicy = Load
        Load = 100
        Prerequisites = { ShrMemSeg=5, Semaphores=10, Processors=6 }
        )
group Database3 (
        SystemList = { LgSvr1, LgSvr2, LgSvr3, MedSvr1, MedSvr2, MedSvr3,
                        MedSvr4, MedSvr5 }
        SystemZones = { LgSvr1=0, LgSvr2=0, LgSvr3=0, MedSvr1=1, MedSvr2=1,
                        MedSvr3=1, MedSvr4=1, MedSvr5=1 }
        AutoStartPolicy = Load
        AutoStartList = { LgSvr1, LgSvr2, LgSvr3 }
        FailOverPolicy = Load
        Load = 100
        Prerequisites = { ShrMemSeg=5, Semaphores=10, Processors=6 }
        )
group Application1 (
        System List = { LgSvr1, LgSvr2, LgSvr3, MedSvr1, MedSvr2, MedSvr3,
                        MedSvr4, MedSvr5 }
        SystemZones = { LgSvr1=0, LgSvr2=0, LgSvr3=0, MedSvr1=1, MedSvr2=1,
                        MedSvr3=1, MedSvr4=1, MedSvr5=1 }
        AutoStartPolicy = Load
        AutoStartList = { MedSvr1, MedSvr2, MedSvr3, MedSvr4, MedSvr5 }
        FailOverPolicy = Load
        Load = 50
```

-continued

```
  )
  group Application2 (
      SystemList = { LgSvr1, LgSvr2, LgSvr3, MedSvr1, MedSvr2, MedSvr3,
                  MedSvr4, MedSvr5 }
      SystemZones = { LgSvr1=0, LgSvr2=0, LgSvr3=0, MedSvr1=1, MedSvr2=1,
                  MedSvr3=1, MedSvr4=1, MedSvr5=1 }
      AutoStartPolicy = Load
      AutoStartList = { MedSvr1, MedSvr2, MedSvr3, MedSvr4, MedSvr5 }
      FailOverPolicy = Load
      Load = 50
      )
  group Application3 (
      SystemList = { LgSvr1, LgSvr2, LgSvr3, MedSvr1, MedSvr2, MedSvr3,
                  MedSvr4, MedSvr5 }
      SystemZones = { LgSvr1=0, LgSvr2=0, LgSvr3=0, MedSvr1=1, MedSvr2=1,
                  MedSvr3=1, MedSvr4=1, MedSvr5=1 }
      AutoStartPolicy = Load
      AutoStartList = { MedSvr1, MedSvr2, MedSvr3, MedSvr4, MedSvr5 }
      FailOverPolicy = Load
      Load = 50
      )
  group Application4 (
      SystemList = { LgSvr1, LgSvr2, LgSvr3, MedSvr1, MedSvr2, MedSvr3,
                  MedSvr4, MedSvr5 }
      SystemZones = { LgSvr1=0, LgSvr2=0, LgSvr3=0, MedSvr1=1, MedSvr2=1,
                  MedSvr3=1, MedSvr4=1, MedSvr5=1 }
      AutoStartPolicy = Load
      AutoStartList = { MedSvr1, MedSvr2, MedSvr3, MedSvr4, MedSvr5 }
      FailOverPolicy = Load
      Load = 50
      )
  group Application5 (
      SystemList = { LgSvr1, LgSvr2, LgSvr3, MedSvr1, MedSvr2, MedSvr3,
                  MedSvr4, MedSvr5 }
      SystemZones = { LgSvr1=0, LgSvr2=0, LgSvr3=0, MedSvr1=1, MedSvr2=1,
                  MedSvr3=1, MedSvr4=1, MedSvr5=1 }
      AutoStartPolicy = Load
      AutoStartList = { MedSvr1, MedSvr2, MedSvr3, MedSvr4, MedSvr5 }
      FailOverPolicy = Load
      Load = 50
      )
```

AutoStart Operation

Using the example configuration file above, the following AutoStart Sequence is possible:

Database1—LgSvr1
Database2—LgSvr2
Database3—LgSvr3
Application1—MedSvr1
Application2—MedSvr2
Application3—MedSvr3
Application4—MedSvr4
Application5—MedSvr5

Normal Operation

Assuming the above configuration, the following can be determined:

LgSvr1
AvailableCapacity=100
CurrentLimits={ShrMemSeg=10, Semaphores=20, Processors=12}
LgSvr2
AvailableCapacity=100
CurrentLimits={ShrMemSeg=10, Semaphores=20, Processors=12}
LgSvr3
AvailableCapacity=100
CurrentLimits={ShrMemSeg=10, Semaphores=20, Processors=12}
MedSvr1
AvailableCapacity=50
CurrentLimits={ShrMemSeg=5, Semaphores=10, Processors=6}
MedSvr2
AvailableCapacity=50
CurrentLimits={ShrMemSeg=5, Semaphores=10, Processors=6}
MedSvr3
AvailableCapacity=50
CurrentLimits={ShrMemSeg=5, Semaphores=10, Processors=6}
MedSvr4
AvailableCapacity=50
CurrentLimits={ShrMemSeg=5, Semaphores=10, Processors=6}
MedSvr5
AvailableCapacity=50
CurrentLimits={ShrMemSeg=5, Semaphores=10, Processors=6}

Failure Scenario

The configuration above shows FailOverPolicy=Load and SystemZones. The database zone (System Zone 0) is capable of handling up to two failures. Each server has adequate Limits to support up to three database application groups (with an expected performance drop when all database application groups are running on one server). Similarly, the application zone has excess capacity built into each system.

In this example, each of MedSvr1 through MedSvr5 specifies Limits to support one database, even though the application groups G4 through G8 do not specify Prerequisites: This configuration allows a database to fail across SystemZones if absolutely necessary and run on the least loaded application zone machine.

For the first failure example, assume system LgSvr3 fails. The cluster management application scans all available systems in Database2's SystemList, with the same SystemZones grouping as LgSvr3. The cluster management application then creates a subset of systems meeting the application group's Prerequisites. In this case, LgSvr1 and LgSvr2 meet all necessary Limits, and Database1 is brought online on LgSvr1. The following configuration for the database zone is produced:

LgSvr1
AvailableCapacity=0
CurrentLimits={ShrMemSeg=5, Semaphores=10, Processors=6}
LgSvr2
AvailableCapacity=100
CurrentLimits={ShrMemSeg=10, Semaphores=15, Processors=12}

In this scenario, a further failure of a database can be tolerated, as each system has remaining Limits sufficient to accommodate the database application group running on the peer system.

Cascading Failure Scenario

If the performance of a specific database is unacceptable with two database groups running on one server (or three following a second failure), the SystemZones policy has another helpful effect. Failing a database group into the application zone has the effect of resetting its preferred zone. For example, in the above scenario, Database I has been moved to LgSvr1. The administrator could reconfigure the application zone to move two application groups to one system. Then the database application can be switched to the empty application server (MedSvr1-MedSvr5). This will place Database1 in Zone1 (the application zone). If a failure occurs in Database1, the least-loaded server in the Application zone meeting its Prerequisites is selected as the failover target.

What is claimed is:

1. A method comprising:
   determining whether no single system among a plurality of systems meets a resource requirement for hosting a first application among a plurality of applications running on the plurality of systems; and
   if the determining indicates that no single system among the plurality of systems meet the resource requirement,
      using a priority of the first application and a respective priority for each of the plurality of applications running on the plurality of systems for identifying a resource to free, wherein the resource is one of a plurality of resources and is used by at least one of the plurality of applications, and wherein each of the plurality of resources is associated with at least one of the plurality of systems,
      determining whether freeing the resource would cause a first system, associated with the resource, among the plurality of systems to meet the resource requirement,
      freeing the resource in response to the identifying the resource and in response to a determination that freeing the resource would cause the first system to meet the resource requirement, and
      hosting the first application on the first system using the resource.

2. The method of claim 1 wherein
   the identifying the resource further comprises
   using a respective capacity for each of the plurality of systems for identifying the resource.

3. The method of claim 1 wherein the freeing the resource comprises stopping a second application that is using the resource, wherein the second application has a lower respective priority than a respective priority of the first application.

4. The method of claim 1 wherein
   the freeing the resource comprises moving a second application that is using the resource to a second system among the plurality of systems, wherein
   the second application has a lower respective priority than a respective priority of the first application.

5. The method of claim 1 further comprising:
   determining that the first application is to be started.

6. The method of claim 5 wherein
   the determining that the first application is to be started comprises
   detecting that the first application failed.

7. The method of claim 5, wherein
   the determining that the first application is to be started comprises
   comparing the priority of the first application with each of a set of respective priorities for a set of the applications running on the plurality of systems, and
   determining that the first application is to be started when the respective priority of the first application is higher than one of the set of respective priorities for the set of applications running on the plurality of systems.

8. The method of claim 1 wherein
   the determining comprises
   ascertaining whether a selected system among the plurality of systems meets a prerequisite for the first application.

9. The method of claim 1 wherein
   the determining comprises
   ascertaining whether the first application does not exceed a limit for a selected system among the plurality of systems.

10. An apparatus comprising:
    a processor;
    a first determining circuit configured to determine whether no single system among a plurality of systems meets a resource requirement for hosting a first application among a plurality of applications running on the plurality of systems;
    an identifying circuit configured to use a priority of the first application and a respective priority for each of the plurality of applications running on the plurality of systems for identifying a resource to free if the determining circuit determines that no single system among the plurality of systems meet the resource requirement, wherein the resource is one of a plurality of resources and is used by at least one of the plurality of applications, and wherein each of the plurality of resources is associated with at least one of the plurality of systems,
    a second determining circuit configured to determine whether freeing the resource would cause a first system, associated with the resource, among the plurality of systems to meet the resource requirement;
    a freeing circuit configured to free the resource in response to the identifying circuit identifying the resource and in response to a determination that freeing the resource would cause the first system to meet the resource requirement, and
    a hosting circuit for causing the first application to be hosted on the first system using the resource.

11. The apparatus of claim 10 wherein
the identifying circuit is further configured to use a respective capacity for each of the plurality of systems for identifying the resource.

12. The apparatus of claim 10 wherein
the freeing circuit comprises a stopping circuit configured to stop a second application that is using the resource, wherein
the second application has a lower respective priority than a respective priority of the first application.

13. The apparatus of claim 10 wherein
the freeing circuit comprises
a moving circuit configured to move a second application that is using the resource to a second system among the plurality of systems, wherein the second application has a lower respective priority than a respective priority of the first application.

14. The apparatus of claim 10
wherein the first determining circuit is further configured to determine that the first application is to be started.

15. The apparatus of claim 14 wherein
the first determining circuit comprises
a detecting circuit configured to detect that the first application failed.

16. The apparatus of claim 14 wherein
the first determining circuit comprises
a comparing circuit configured to compare a respective priority of the first application with each of a set of respective priorities for a set of the applications running on the plurality of systems, wherein
the first determining circuit is configured to determine that the first application is to be started when the respective priority of the first application is higher than one of the set of respective priorities for the set of applications running on the plurality of systems.

17. The apparatus of claim 10 wherein
the first determining circuit comprises
an ascertaining circuit configured to ascertain whether a selected system among the plurality of systems meets a prerequisite for the first application.

18. The apparatus of claim 10 wherein
the first determining circuit comprises
an ascertaining circuit configured to ascertain whether the first application does not exceed a limit for a selected system among the plurality of systems.

\* \* \* \* \*